US006256708B1

(12) United States Patent
Watanabe

(10) Patent No.: US 6,256,708 B1
(45) Date of Patent: Jul. 3, 2001

(54) AUXILIARY BUFFER FOR DIRECT MAP CACHE

(75) Inventor: Masataka Watanabe, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/919,194

(22) Filed: Aug. 28, 1997

(30) Foreign Application Priority Data

Aug. 28, 1996  (JP) .................................................... 8-227227

(51) Int. Cl.[7] .................................................. G06F 12/00
(52) U.S. Cl. .......................................... 711/122; 711/144
(58) Field of Search ..................................... 711/128, 119, 711/121, 141, 144–146, 156, 122

(56) References Cited

U.S. PATENT DOCUMENTS

| 5,241,664 | * | 8/1993 | Ahba et al. ............................ 395/425 |
| 5,355,467 | * | 10/1994 | MacWilliams et al. .............. 711/146 |
| 5,465,342 | * | 11/1995 | Walsh .................................... 395/446 |
| 5,490,113 | * | 2/1996 | Tatosian et al. ................. 365/189.05 |
| 5,561,779 | * | 10/1996 | Jackson et al. ....................... 711/122 |
| 5,623,700 | * | 4/1997 | Parks et al. ............................ 710/53 |
| 5,640,531 | * | 6/1997 | Whittaker et al. .................... 711/118 |
| 5,680,571 | * | 10/1997 | Bauman ................................ 711/122 |
| 5,752,261 | * | 5/1998 | Cochroft, Jr. ......................... 711/133 |
| 5,761,717 | * | 6/1998 | Vishlitzky et al. ................... 711/136 |
| 5,829,027 | * | 10/1998 | Goodrum .............................. 711/122 |
| 5,875,462 | * | 2/1999 | Bauman et al. ...................... 711/119 |
| 5,918,245 | * | 6/1999 | Yung .................................... 711/122 |

FOREIGN PATENT DOCUMENTS

| 4-270431 | 9/1992 | (JP) . |
| 4-288644 | 10/1992 | (JP) . |
| 5-73415 | 3/1993 | (JP) . |
| 5-257807 | 10/1993 | (JP) . |
| 6-12323 | 1/1994 | (JP) . |
| 7-253926 | 10/1995 | (JP) . |
| 2852232 | 11/1998 | (JP) . |

* cited by examiner

Primary Examiner—Matthew Kim
Assistant Examiner—Pierre-Michel Bataille
(74) Attorney, Agent, or Firm—Sughrue, Mion, Zinn, Macpeak & Seas, PLLC

(57) ABSTRACT

The invention provides a second level cache memory system of the direct map type which moderates possible drawbacks arising from a limitation to such second level cache memory system to realize high speed processing while suppressing the cost as far as possible. The second level cache memory system includes a first level cache memory built in a CPU, and a second level cache memory of the direct map write back type for storing part of addresses and data of a main memory. The second level cache memory allows read/write operations at a higher speed than that for the main memory. A system controller is connected to the main memory for controlling the main memory and the second level cache memory, and includes a second cacheable address, status and data buffer for storing, corresponding to a particular region of the main memory which a user uses frequently or wants to use for processing at a speed as high as possible, a plurality of sets each including an address and data driven out from the second level cache memory by replacement of the second level cache memory and a status parameter of the address in the second level cache memory.

5 Claims, 23 Drawing Sheets

L2-TAGRAM

L2 STATUS

L2S ADDRESS AND STATUS PART

L2 DATA SRAM

AUXILIARY BUFFER FOR DIRECT MAP CACHE

BACKGROUND OF THE INVENTION

1. Field of the Invention

This invention relates to a cache memory system for a computer system, and more particularly to a second level cache memory system having a second level cache memory which operates at a high speed and efficiently.

2. Description of the Related Art

An exemplary one of conventional second level cache memory systems is shown in FIG. 21.

Referring to FIG. 21, the conventional second level cache memory system shown includes a central processing unit CPU 31 having a built-in first level cache memory (hereinafter referred to as L1 cache memory) 32, a second level cache memory (hereinafter referred to as L2 cache memory) 33 of the direct map type, a main memory (main storage apparatus) 36, a system controller 35 connected to control the main memory 38, and a host bus 34 for interconnecting the CPU 31, L2 cache memory 33 and system controller 35. A local bus master 38 is connected to the system controller 35 by a local bus 37.

Since the L1 cache memory 32 is built in the CPU 31, it can process at a higher speed than the L2 cache memory 33. The L2 cache memory 33 can process at a higher speed than the main memory 36. The host bus 34 transfers an address, data, status and so forth, In the conventional second level cache memory system having the construction described above, the L2 cache memory 33 has a capacity larger than the L1 cache memory 32 so that it stores part of data of the main memory 36 which are not stored in the L1 cache memory 32 to improve the performance of the second level cache memory system.

In a cache system of the direct map type, communication of data between a main memory and a cache memory is performed in units of one line (block), and the main memory and the cache memory are physically divided and controlled in units of a line. Referring to FIG. 22) an address 41 of a line is divided into a tag (directory: address upper part) 42 and an index (address lower part) 43. Since the cache system of the direct map type is a cache system of the one way set associative type and has a construction wherein tags and indices correspond in a one-by-one corresponding relationship, an address of a line to be stored into a cache memory is stored such that, based on the index thereof, a corresponding tag of the address is stored in a TAGRAM of the cache memory while data is stored into an address of a data storage memory of the cache memory corresponding to the index. Then, a tag of an address memory requested and tags stored In the TAGRAM of the cache memory are compared with each other, and when the tag of the memory requested address and a tag of the cache memory are equal and a VALID flag which represents whether or not the line of the address is valid indicates "valid", the memory requested line results in cache hit. In any other case, the memory requested line results in cache miss.

Accordingly, in the conventional second level cache system of the direct map type, two lines having the same lower address, that is, the same index cannot be stored into the cache memory simultaneously.

On the other hand, in a second level cache system of the write back type (also called store in type), when a result of a memory write request is a second level cache hit, writing into the main memory is not performed, but only writing into the second level cache memory is performed. However, if a write miss of the second level cache memory occurs, the following two systems are available.

(1) Write allocate system: similarly as in a reading operation, even if a second level cache miss occurs, replacement of a line of the second level cache memory is executed.

(2) No write allocate system: when a result of a memory write request is a second level cache miss. replacement of the second level cache memory is not performed, but only writing into the main memory is executed.

A second level cache system of the write back type which is dealt with in the present specification presumes the no write allocate system when a result of a memory request is a second level cache miss. In a second level cache system of the write back type, when a result of a memory write request is a L2 cache hit, since writing is performed only into the second level cache memory, data of the line stored in the second level cache memory is temporarily updated with respect to the main memory, resulting in temporary incoincidence of the data from data of the line stored in the main memory. Control is required to record it using a DIRTY flag that the data of the line stored in the second level cache memory has been updated with respect to the main memory to secure coherency of the data with the main memory. In the control, when replacement of the second level cache memory is performed because of a second level cache miss based on a result of a memory read request, if the VALID flag of the line delivered from the second level cache memory indicates "valid" and the DIRTY flag indicates "update". the line is written back into the main memory once to assure coherency of the data. After the writing back, the read requested line is stored into the second level cache memory.

The conventional second level cache system of the direct map type additionally allows setting of a second level cacheable area, a non-cacheable area, a write-through area, a write back area and so forth in a relationship between the second level cache memory and the main memory. However, the conventional cache system of the direct map type has no measure for storing a particular memory area (hereinafter referred to as L2S cacheable area) as much as possible into the second level cache memory.

Also a method is available wherein a cache system of the two ore more way set associative type is improved in that, for example, one of the two ways is allocated and controlled as a way for exclusive use for the L2S cacheable area. However, where this method is employed, since the system construction is complicated and a higher cost than that of a cache system of the direct map type is required, it is difficult to improve the memory performance at a low cost. Accordingly, generally a second level cache system of the direct map type with which a memory system construction can be realized at a comparatively low cost is propagated widely as a second level cache system for a personal computer.

From the point of view of effective utilization of a L2 cache memory, Japanese Patent Laid-Open Application No. Heisei 5-73415 discloses a countermeasure for reducing overlaps of lines stored in a first level (L1 cache) cache memory in the inside of a CPU and a second level cache memory on the outside of the CPU. This countermeasure realizes effective utilization of the L1 cache memory and the L2 cache memory by employing means for exchanging, when a line corresponding to an address requested by the CPU is not present in the L1 cache memory but present in the L2 cache memory, a line present in the L2 cache memory for another line present in the L1 cache memory.

Meanwhile, Japanese Patent Laid-Open Application No. Heisei 5-257807 discloses a system which improves the processing speed in reading from a main memory when a L1 cache read miss occurs and also a L2 cache read miss occurs.

Further, Japanese Patent Laid-Open Application No. Heisei 4-288644 discloses a system wherein, when a read miss occurs both with a L1 cache system and a L2 cache system, not read data from a main memory are stored simply into the L1 cache memory and the L2 cache memory in an overlapping condition, but a first level cache monitor is adopted so that, depending upon the internal state of the L1 cache memory, for example, in a case wherein an invalid (INVALID) cache line is not present in the L1 cache memory, such processing that a cache line from the main memory is stored only into the L2 cache memory but is not stored into the L1 cache memory is performed in order to achieve effective utilization of the L1 cache memory and the L2 cache memory and reduction of simultaneous read misses of the L1 cache memory and the L2 cache memory.

As described above, with the conventional second level cache system of the direct map type, when an A line and a B line which have the same lower address as an index to be stored into the TAGRAM are frequently read accessed from the CPU, for example, in multi-task processing or the like, since it is impossible to store both of the A line and the B line simultaneously into the L2 cache memory, cache line filling is performed each time the A line and the B line are accessed alternately. Accordingly, the accessing then is not L2 cache accessing but is converted into a main memory read cycle, and the processing speed becomes low although the A line and the B line are lines which belong to the cacheable area.

Further, with the conventional second level cache system of the direct map system, when a user has an area (second level cacheable area) which is desired to be cache accessed as much as possible during starting of the system and then wants to add or delete another cacheable area to or from the current range of the cacheable area during operation of the system, the entire second level cache memory must be flashed. Further, in the second level cache system of the direct map type, where the L2 cacheable area is divided into a plurality of sub areas to form a second level cache map, it is impossible to store a particular sub area preferentially into the second level cache memory.

SUMMARY OF THE INVENTION

It is an object of the present invention to provide a second level cache memory system of the direct map type which moderates possible drawbacks arising from a limitation to such second level cache memory system (it is impossible to store two lines having the same lower address which is an address in a TAGRAM, that is, a lower address of a L2 cache line, into a L2 cache memory) to realize high speed processing while suppressing the cost as far as possible.

In order to attain the object described above, according to the present invention, a second level cache memory system is generally constructed such that, when it is to perform multi-task processing of a high load, even if a L2 cache read miss occurs in response to an access to a particular memory area (second cacheable area) set by a user, lines which belong to a L2S cacheable area are stored into second cacheable address, status and data buffers which are auxiliary buffers to which accessing equivalent to that to a L2 cache memory (accessing higher in speed to that to a main memory) to allow higher speed processing than that of the other L2 cacheable area.

Further, even if the second cacheable address, status and data buffers have a smaller capacity than the L2 cache memory, control in the inside of the second cacheable address, status and data buffers is devised so as to allow effective utilization of the L2 cache memory and the second cacheable address, status and data buffers to improve the memory performance at a low cost.

More particularly, according to the present invention, there is provided a second level cache memory system, comprising a first level cache memory built in a central processing unit, a second level cache memory of the direct map write back type for storing part of addresses and data of a main memory, the second level cache memory allowing read/write operations at a higher speed than that for the main memory, a system controller connected to the main memory for controlling the main memory and the second level cache memory, and a second cacheable address, status and data buffer provided in the system controller for storing, corresponding to a particular region of the main memory which a user uses frequently or wants to use for processing at a speed as high as possible, a plurality of sets each including an address and data driven out from the second level cache memory by replacement of the second level cache memory and a status parameter of the address in the second level cache memory.

Preferably, when a cache miss occurs with the second level cache memory as a result of a request to the main memory from a local bus master connected to the CPU or the system controller by a local bus, data is transferred from the second cacheable address, status and data buffer to the local bus master.

Preferably, when an address and data are to be entered into the second level cache memory, the second cacheable address, status and data buffer and the second level cache memory are controlled using a flag which represents whether or not the address of an object of the entry belongs to the particular region.

Preferably, the second level cache memory system further comprises a plurality of access counters provided in the second cacheable address, status and data buffer each for recording, when, in response to a request from the CPU or the local bus master, for an address and data stored in the second cacheable address, status and data buffer data corresponding to the address requested is transferred from the second cacheable address, status and data buffer, information representing that the data corresponding to the requested address has been transferred from the second cacheable address, status and data buffer, the access counters being used for internal control of the second cacheable address, status and data buffer, control of the second level cache memory and control of the main memory.

In the second level cache memory system employing the direct map write back type described above, when multi-task processing of a high load is to be performed, when the particular memory area set is accessed by a user, even if a cache miss occurs with the second level cache memory, since lines which belong to the particular memory area are temporarily stored in the second cacheable address, status and data buffer which can be accessed at a substantially equal speed to that of accessing to the second level cache memory, that is, at a speed higher than that of accessing to the main memory, a memory request by the access by the user can be coped with by the second cacheable address, status and data buffer. Consequently, the access by the user can be processed at a higher speed than any other access to the remaining area of the main memory.

Further, the second level address, status and data buffer supports write back to the particular area of the main memory and grasps states of the main memory and the second level cache memory. Thus, the second level address, status and data buffer performs write back to the second level cache memory or the main memory from the inside of the second level address, status and data buffer without giving a burden to control of any other memory or without having a bad influence on the memory area of the main memory other than the particular area. Thus, due to the efficient operation of the second level cache memory system and the efficient control of the second level address, status and data buffer, the memory accessing property is improved significantly.

Further, since the second level address, status and data buffer can operate basically independently of the second level cache memory, by paying such a minimum penalty that only required lines indicated by the flags are written back into the main memory, it is possible to secure coherency of data between the second level cache memory and the main memory during operation of the system and vary the particular memory area set by a user without the necessity for flashing the second level cache memory.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
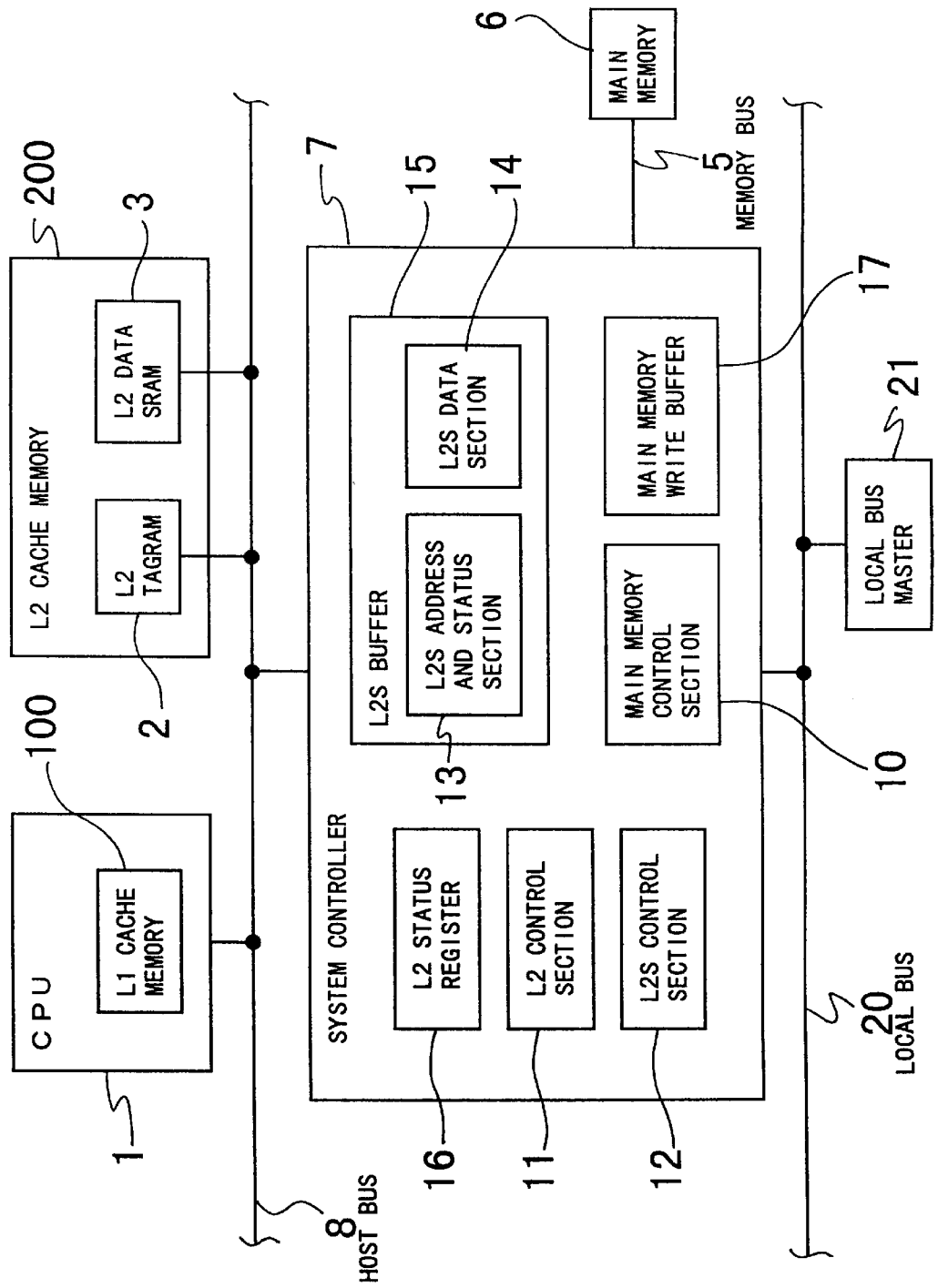
FIG. 1 is a block diagram of a second level cache memory system showing a preferred embodiment of the present invention.

Referring first to FIG. 1, there is shown a computer in which a cache memory system (hereinafter referred to L2S cache memory system) of the present invention is incorporated. The computer shown includes a CPU 1 having a L1 cache memory 100 in the inside thereof, a L2 TAGRAM 2 having entries into which address parts of a L2 cache memory 200 are to be stored, a L2 data SRAM 3 for storing data corresponding to the L2 TAGRAM 2, a system controller 7, a host bus 8 for interconnecting the CPU 1, L2 TAGRAM 2, L2 data SRAM 3 and system controller 7, a main memory 6 connected to the system controller 7 by a memory bus 5, and a local bus master 21 connected to the system controller 7 by a local bus 20.

The L2 cache memory 200 is composed of the L2 TAGRAM 2 and the L2 data SRAM 3, and status parameters in the L2 cache memory 200 of lines corresponding to the individual entries of the L2 cache memory 200 are incorporated as L2 status register 16 in the inside of the system controller 7.

The system controller 7 further includes a L2S buffer 15 for storing a plurality of sets each including an address part, a status part and a data part of a line which belongs to the L2S cacheable area, a L2 control section 11 for performing ordinary control regarding the L2 cacheable area, a L2S control section 12 for performing control regarding the L2S cacheable area, a main memory control section 10 for controlling the main memory 6 and a main memory write buffer 17, and other function circuits not shown.

The L2S buffer 15 is an N-stage buffer which adopts a form similar to that of a FIFO memory and includes a L2S address and status section 13 for storing a plurality of sets each including an address part and a status part of the L2S cacheable area, and a L2S data section 14 for storing data stored at addresses of the main memory 6 corresponding to addresses of the individual stages of the L2S address and status section 13.

Figure 2:
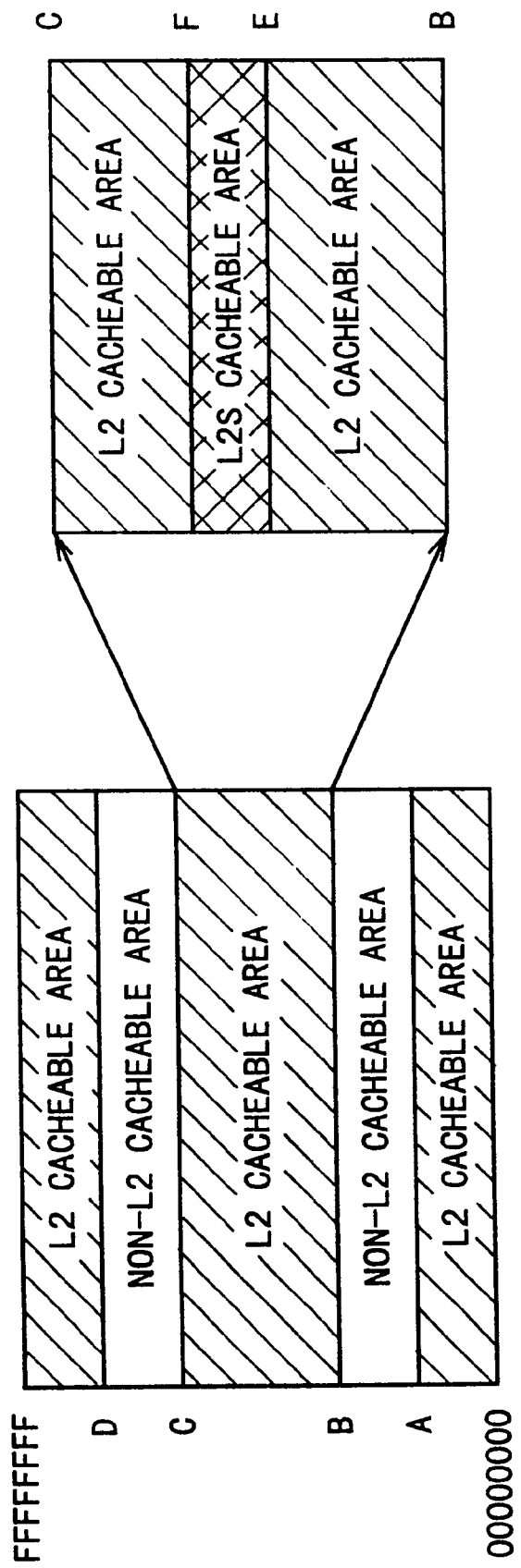
FIG. 2 is a memory map diagram of the second level cache memory system of FIG. 1.

Referring now to FIG. 2, the memory area of the present computer has 4 Gbytes in the maximum, and accordingly, an address is represented by 32 bits. The memory map includes addresses 0 h to FFFFFFFFh (h represents that the value is a hexadecimal value). Upon initialization of the system, the addresses of 0 h to A, B to C and D to FFFFFFFFh in the memory area are set as the L2 cacheable area, and further, an area from E to F which is part of the block of B to C of the L2 cacheable area is set as the L2S cacheable area. The L2S cacheable area Is part of the L2 cacheable area, and the length of one line in the L2 cacheable area and the length of one line in the L2S cacheable area are equal to each other.

Subsequently, a relationship between the memory area described above and addresses connected to the individual blocks shown in FIG. 1 is described with reference to FIGS. 3(a) to 3(e).

Figure 3A:
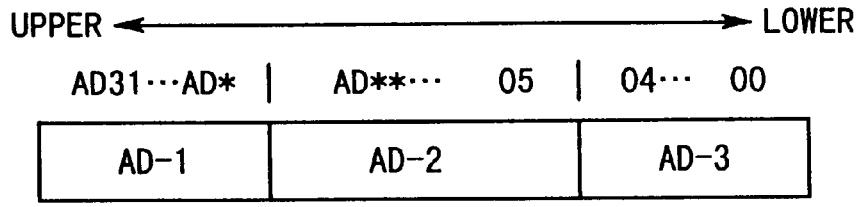
FIGS. 3(a) to 3(e) are diagrammatic views illustrating addresses in the second level cache memory system of FIG. 1.

Referring first to FIG. 3(a), an address handled in the present computer is composed of 32 bits and divided into an AD-1 (AD31 to AD*) which corresponds to an address upper tag, an AD-2 (AD** to AD05) which corresponds to an address lower index, and an AD-3 (AD04 to AD00) representative of an address in an L2S cache line. Here, AD*=AD**+1

Figure 3B:
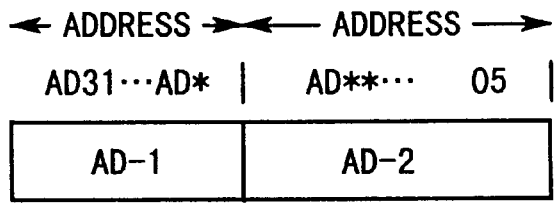

Referring to FIG. 3(b), data (tag) stored in the L2 TAGRAM 2 is the address upper AD-1, and the address (index) for indexing the L2 TAGRAM 2 is the address lower AD-2.

Figure 3C:

Referring to FIG. 3(c), an address for indexing the L2 status register 16 is the address lower AD-2, and data stored in the L2 status register 16 include a VALID flag representative of whether or not a line stored in the L2 cache memory 200 is valid, a DIRTY flag representative of whether or not a line stored in the L2 cache memory 200 has been updated with respect to the main memory 6, and an SD flag representative of whether or not a line stored in the L2 cache memory 200 belongs to the L2S cacheable area.

Figure 3D:
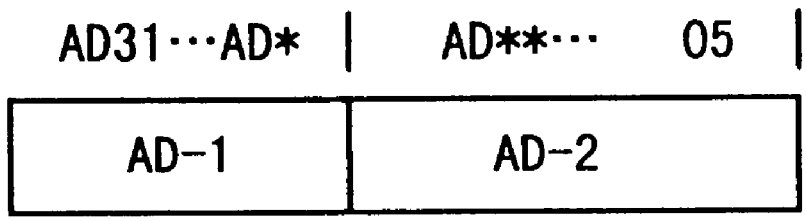

Referring to FIG. 3(d), an address stored in the L2S address and status section 13 is the address upper AD-1 and the address lower AD-2.

Figure 3E:
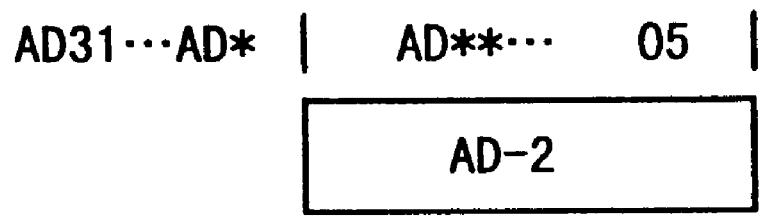

Referring to FIG. 3(e), an address for indexing the L2 data SRAM 3 is the address lower AD-2.

Subsequently, the L2S buffer 15 is described with reference to FIGS. 4 and 5.

As described above, the L2S buffer 15 includes the L2S address and status section 13 and the L2S data section 14.

Figure 4:
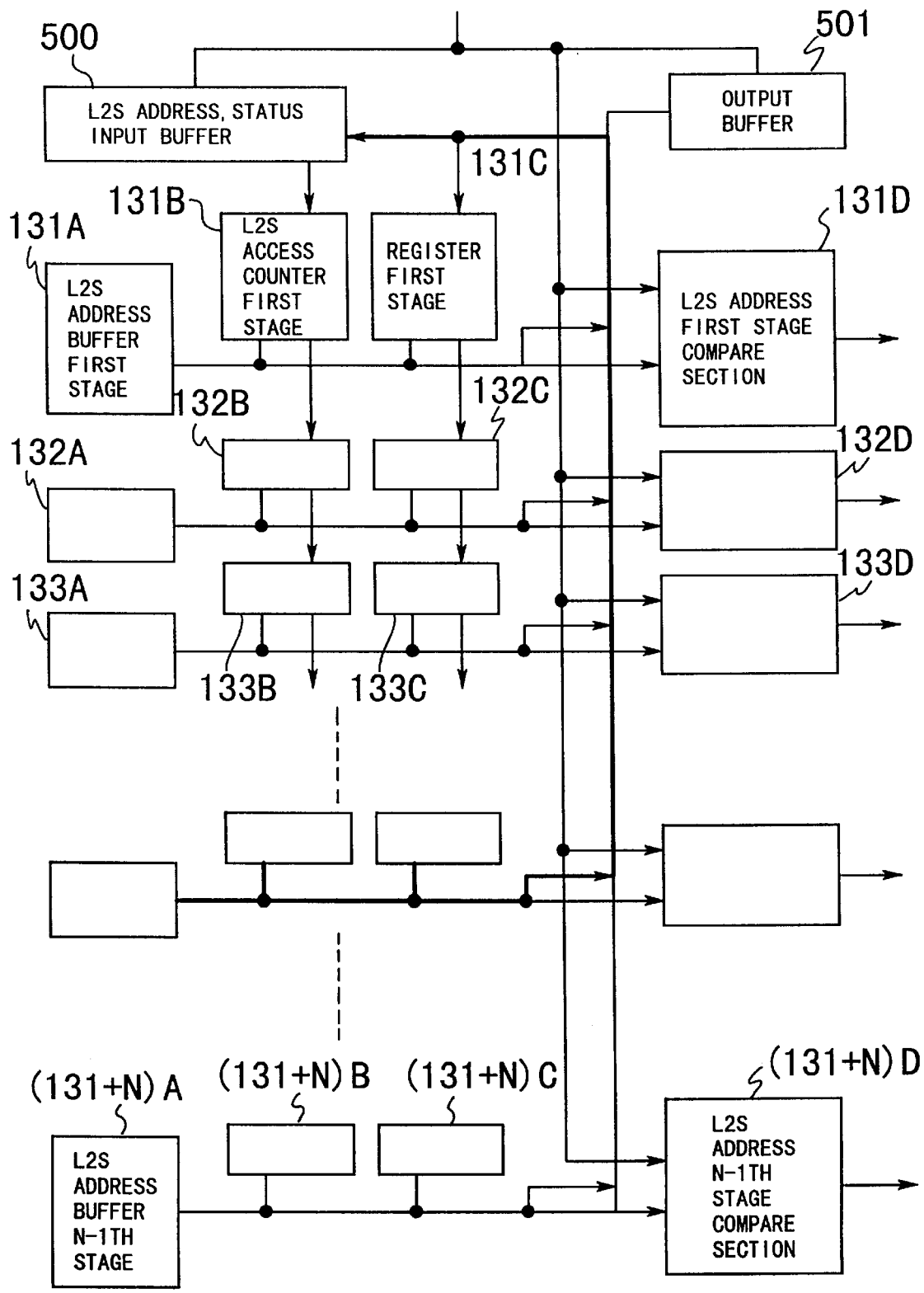
FIG. 4 is a block diagram showing a construction of a L2S address and status section of a L2S buffer in the second level cache memory system of FIG. 1.

Referring first to FIG. 4, the L2S address and status section 13 includes a L2S address input buffer 500 serving as an interface latch, an output buffer 501, L2S address buffer first to N−1th stages 131A to (131+N)A which serve as substantial address buffers, L2S address first to N−1th stage compare sections 131D to (131+N)D which are comparison circuits corresponding to the L2S address buffer first to N−1th stages 131A to (131+N)A, L2S access counter first to N−1th stages 131B to (131+N)B for recording or updating an access from the CPU 1 or the local bus master 21 to a line stored in any stage of the L2S address buffer 15, and register first to N−1th stages 131C to (131+N)C for storing VALID flags and DIRTY flags representing status of individual addresses stored in the L2S buffer 15.

Figure 5:
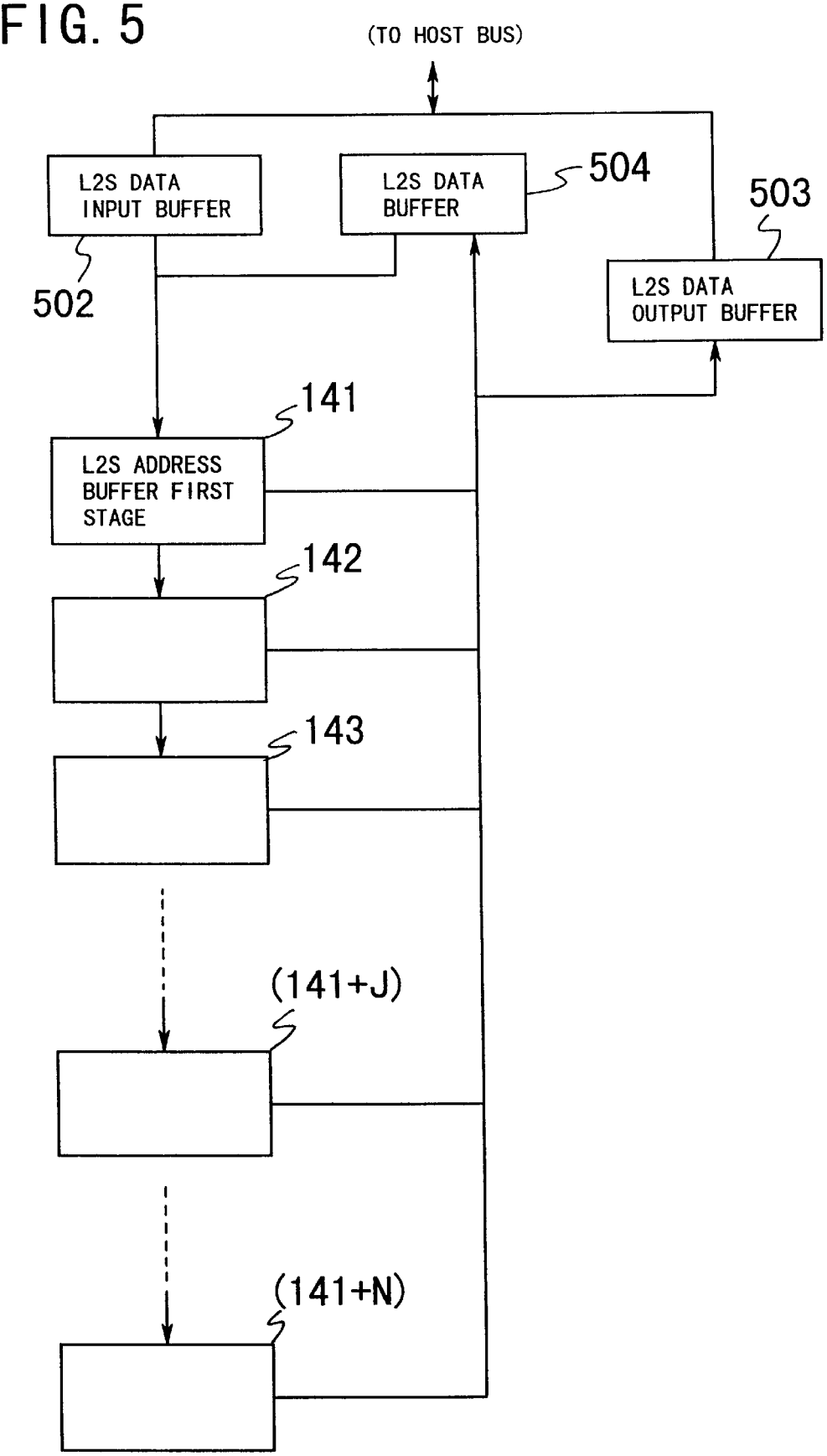
FIG. 5 is a block diagram showing a construction of a L2S data section of the L2S buffer in the second level cache memory system of FIG. 1.

Referring now to FIG. 5, the L2S data section 14 includes a pair of L2S data input buffers 502 and 504 serving as interface latches, a L2S data output buffer 503, and L2S data buffer first to N−1th stages 141 to (141+N) for storing data corresponding to the L2S address buffer first to N−1th stages 131A to (131+N)A.

Subsequently, operation of the computer of FIG. 1 is described with reference to FIGS. 6 to 20.

Two lines which have an equal index (address) (AD-2) and belong to the L2S cacheable area are represented by A line and B line, and a different line whose address (AD-2) is same as those of the A line and the B line is represented by C line.

Figure 6:
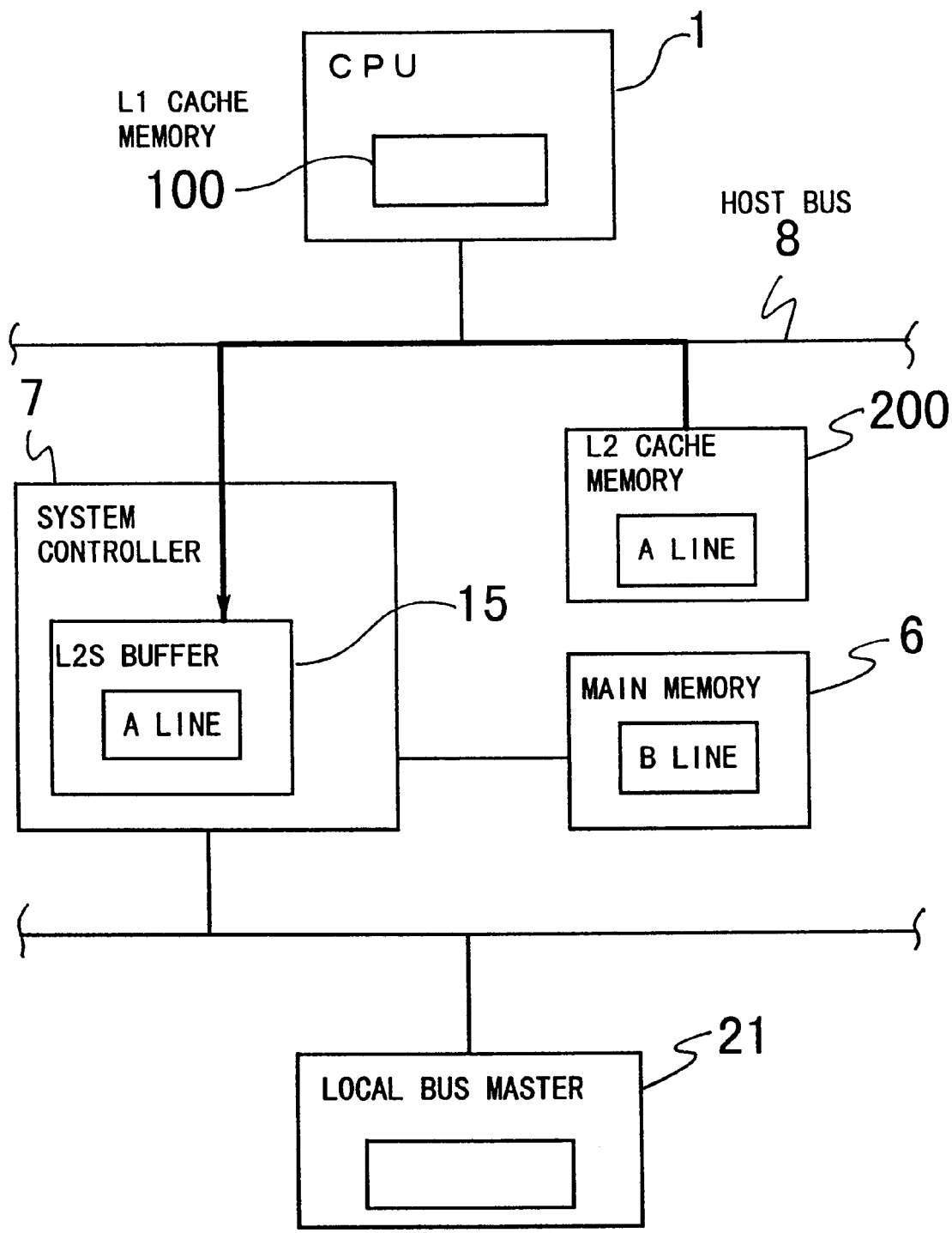
FIGS. 6 to 20 are block diagrams illustrating different flows of signals in the second level cache memory system of FIG. 1.
Figure 7:
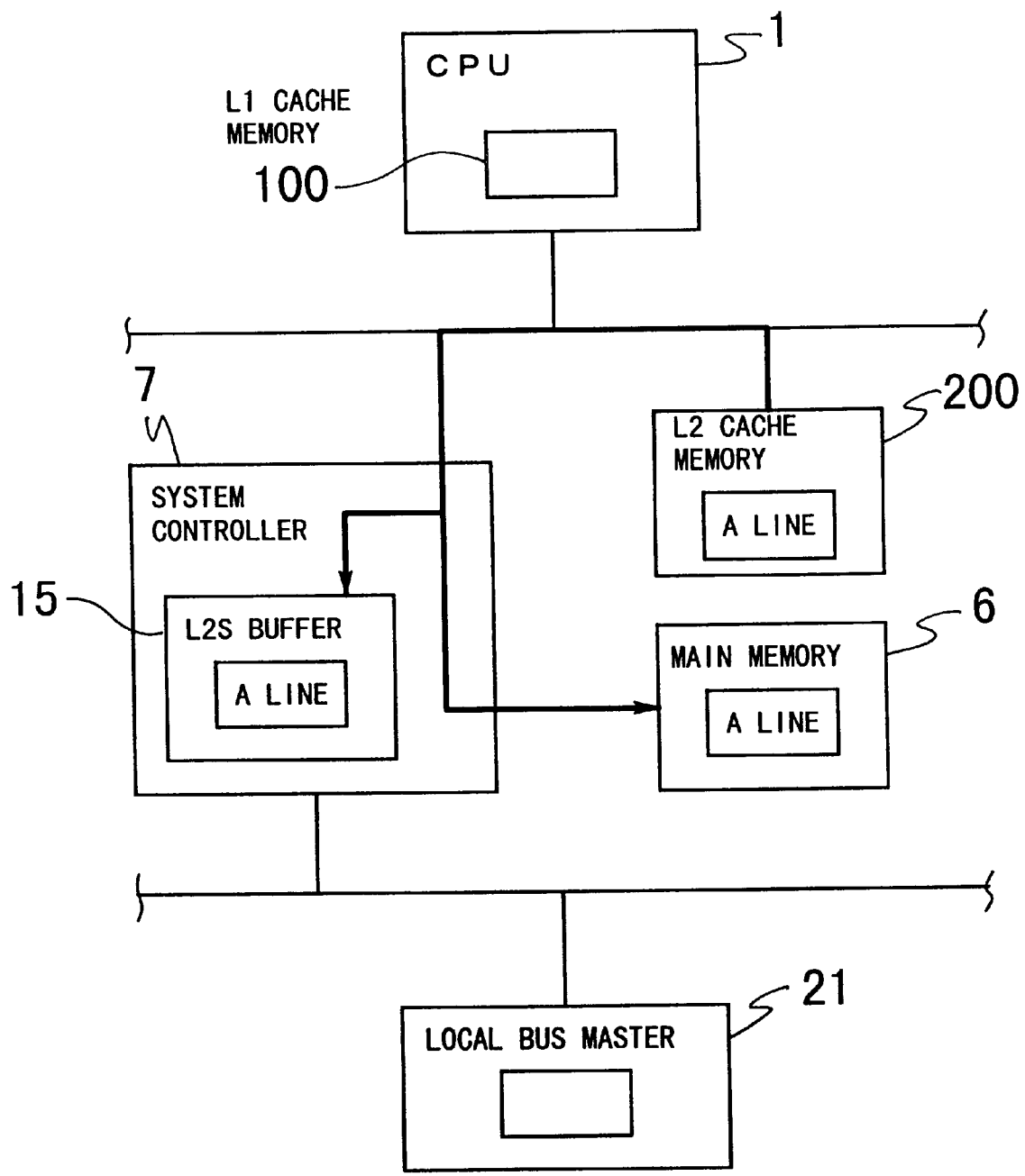
Figure 8:
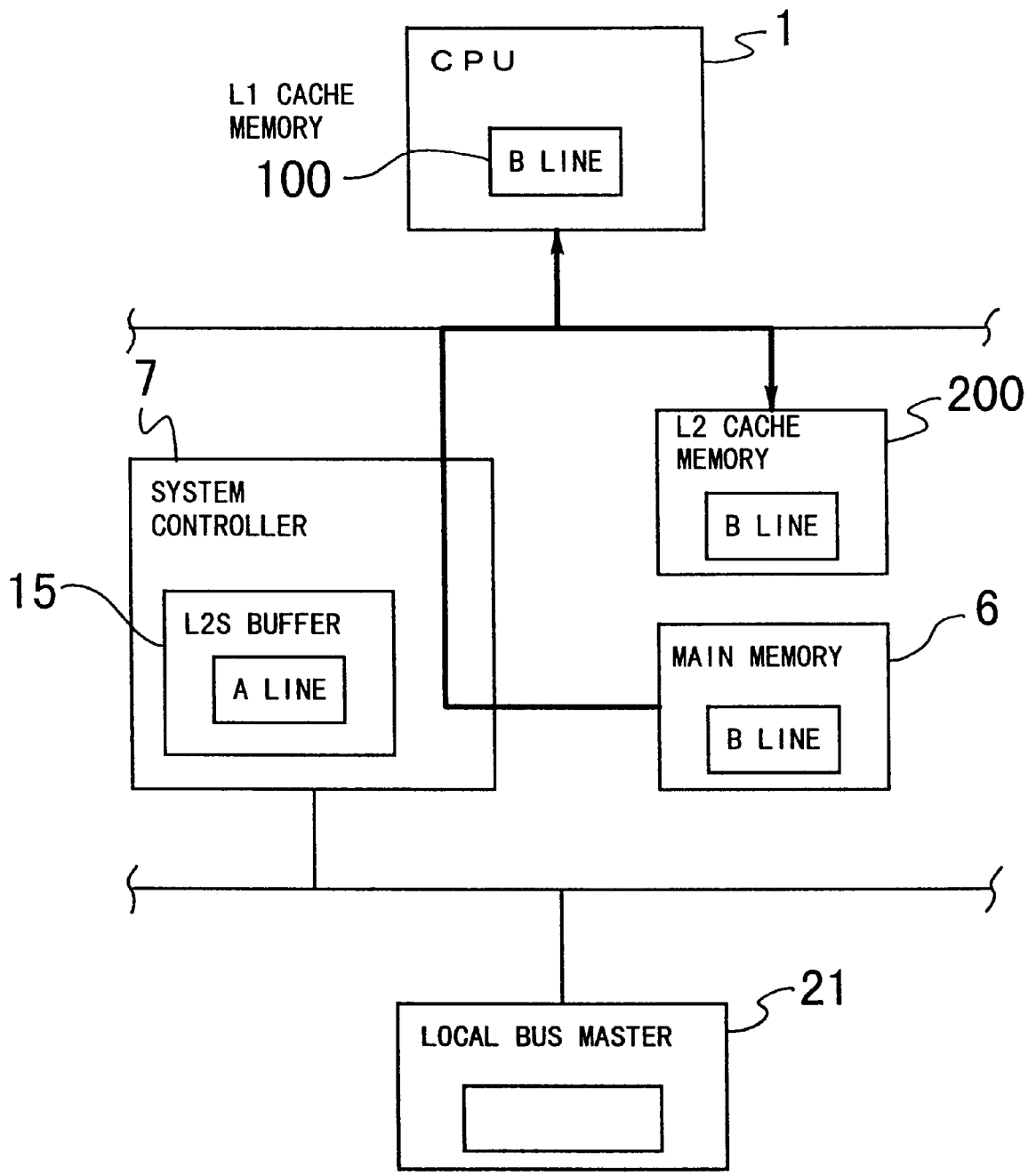
Figure 9:
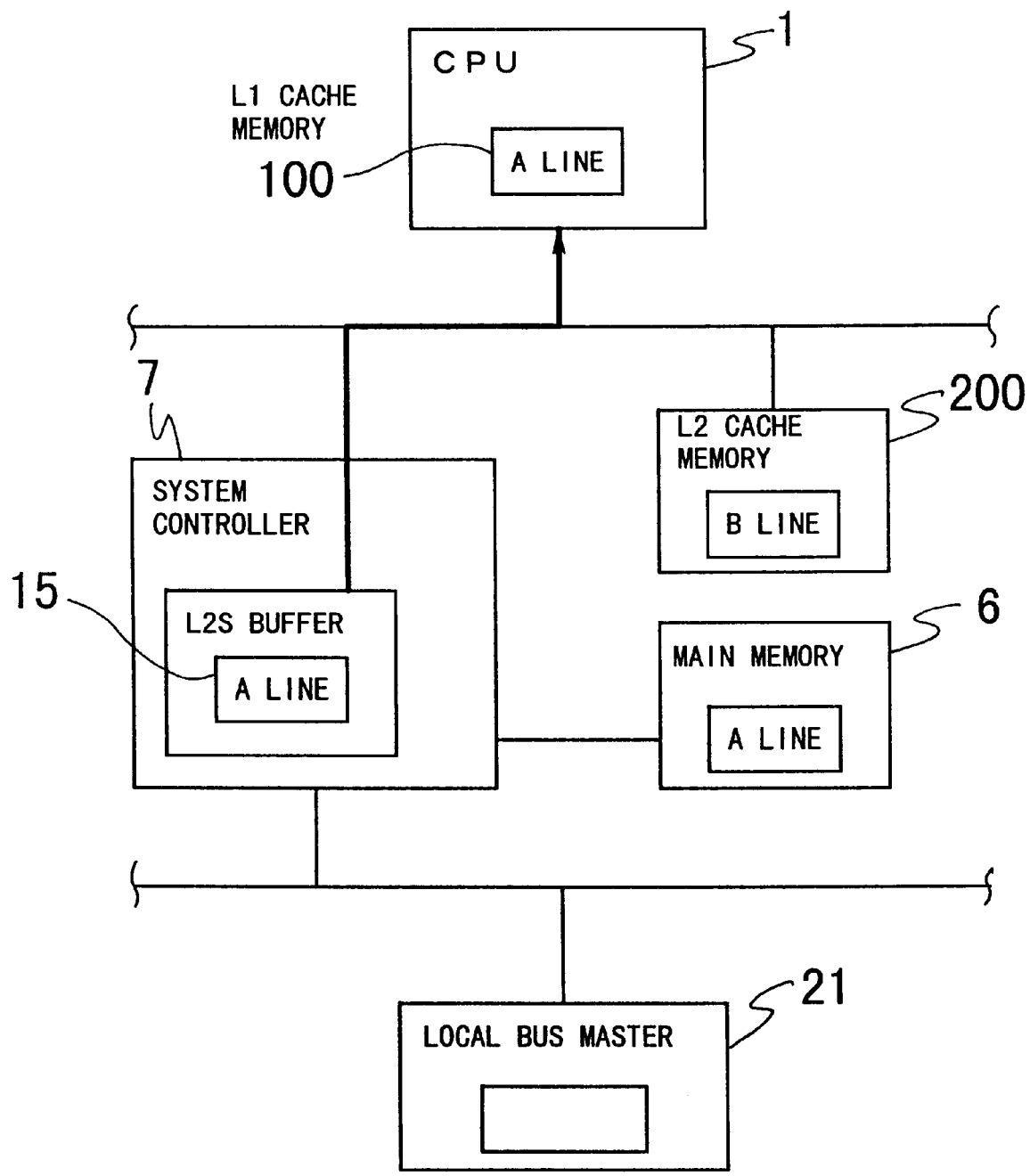
Figure 10:
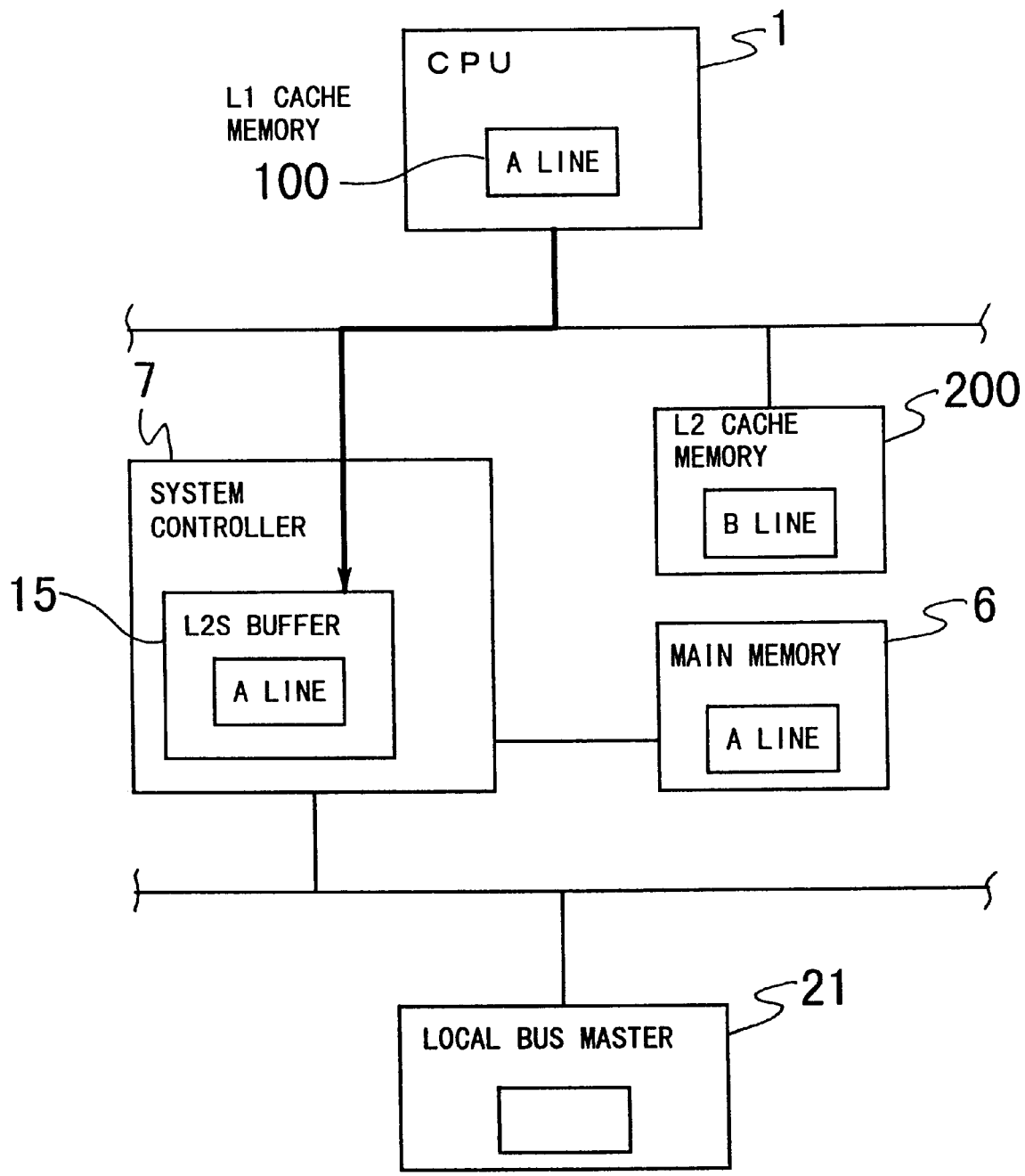

(1) First, a case wherein a result of a read request from the CPU 1 to the main memory 6 regarding the B line is a miss with the L2 cache memory 200 Is described (refer to FIG. 6).

When the address of the B line requested by the CPU 1 is received by the L2 TAGRAM 2 via the host bus 8, it is discriminated that a L2 cache miss occurs. A read request is issued from the main memory control section 10 to the main memory 6 without waiting for a determination of a hit miss by the L2 cache memory 200 and the L2S buffer 15. If a hit is determined otherwise, then the read request is canceled later.

The main memory control section 10 controls the main memory 6 so that data designated by the address on the request on the host bus 8 are read out from the main memory 8, and transfers the data to the CPU 1 via the host bus 8. Further, the B line is stored into the L2 data SRAM 3 by the L2 control section 11, and furthermore, the address upper AD-1 of of the address of the B line is stored into an entry of the L2 TAGRAM 2 designated by the address lower AD-2.

Meanwhile, thee L2S control section 12 detects whether or not the address read requested by the CPU 1 belongs to the L2S cacheable area. If the address belongs to the L2S cacheable area, then the SD flag of the corresponding entry of the L2 status register 16 is changed so as to indicate the L2S cacheable area, and the VALID flag is set to "valid". The DIRTY flag is set to "common" representing that the line B is common with the main memory.

Simultaneously as the address of the B line requested by the CPU 1 is outputted to the host bus 8, the L2S control section 12 indexes the entry corresponding to the request address AD-2 of the L2 status register 16 and checks the SD flag, VALID flag and DIRTY flag to discriminate whether or not the address driven out from the L2 cache memory 200 is in the L2S cacheable area. If the result of the discrimination reveals that the SD flag does not indicate the L2S cacheable area and the VALID and DIRTY flags indicate "common", only the processing of (1) is performed.

(2) If the line to be driven out (hereinafter referred to as A line) is in the L2S cacheable area and the VALID-flag of the A line indicates "valid", then before the B line is transferred from the main memory 6 to the CPU 1 and stored into the L2 cache memory 200 (refer to FIG. 8), the A line is stored into a free stage of the L2S buffer 15 (for which the VALID flag Is not "valid") (refer to FIG. 6). In particular, the address upper AD-1 of the memory address driven out from the L2 TAGRAM 2 and the address lower AD-2 of the request are placed and the VALID flag and the DIRTY flag of the status flags of the A line from the L2 status register 16 are stored into the L2S address input buffer 500 of the L2S address and status section 13, and then the address upper AD-1 and the address lower AD-2 are stored into one of the L2S address buffer first to N−1th stages 131A to (131+N)A. When the A line is to be stored into the L2S buffer 15, if the DIRTY flag of the A line indicates "update", then the L2S control section 12 confirms the state of the main memory write buffer 17 from the main memory control section 10. If the main memory write buffer 17 has some free area, then the L2S control section 12 stores the A line into the L2S buffer 15 and simultaneously performs write back processing to the main memory 6 (refer to FIG. 7). Accordingly, since the latest data of the A line is left in the main memory 6, the DIRTY flag of the A line to be stored into the L2S buffer 15 is set to "common". On the other hand, when the main memory write buffer 17 has no free area, the A line is stored only into the L2S buffer 15, but is not written back into the main memory 6 simultaneously. Accordingly, the DIRTY flag of the A line to be stored into the L2S buffer 15 then is stored while remaining as "update".

Further, the data of the A line is stored into a corresponding stage of the L2S address and status section 13 via the L2S data input buffer 502 of the L2S data section 14. Further, when the A line is to be stored into the L2S buffer 15, if a plurality of lines whose VALID flags indicate "invalid" are stored in the L2S buffer 15, then the A line is stored into that stage in which the oldest invalid line is stored. However, if only one line whose VALID flag indicates "invalid" is stored in the L2S buffer 15, then the A line is stored into the stage in which the one line is stored. When all of the VALID flags of lines of the stages stored in the L2S buffer 15 indicate "valid", the oldest one of those stages whose VALID flags are not "update", that is, are "common", is deleted, and the A line is stored into the stage. Where the DIRTY flag of "common" is indicated in only one line, the A line is stored into the stage in which the line is stored. If all of the VALID flags of the lines stored in the L2S buffer 15 indicate "update", a line stored in the buffer of the oldest stage of the L2S buffer 15 is written back into the main memory 6, and then the A line is stored into the stage.

(3) Subsequently, a case wherein a request is issued from the CPU 1 or the local bus master 21 for the A line which has been driven out from the L2 TAGRAM 2 and is stored in the L2S buffer 15 and whose VALID flag indicates "valid" is described. It is assumed that the A line has been stored into the Jth stage of the L2S buffer 15. (It is assumed that the total buffer stage number of the L2S buffer 15 is N, and J and N have a relationship of 1<J<N).

Similarly as in the case (1) above, when a cache miss occurs with the L2 cache memory 200, the memory address of the request is stored into the L2S address and status section 13 of the L2S buffer 15 and the L2 status register 16 of the L2 TAGRAM 2, and is compared with addresses stored in the L2S address buffer first to N−1th stages 131A to (131+N)A of the L2S address and status section 13 of the L2S buffer 15 by the L2S address first to N−1th stage compare sections 131D to (131+N)D, respectively. In this instance, since the address of the A line has been stored into the Jth stage of the L2S address and status section 13 in the processing (2) above, a result of the comparison proves coincidence. Further, a state of the L2 status register 16 of the L2 TAGRAM 2 corresponding to the requested address lower AD-2 is simultaneously recognized by the L2 control section 11 and the L2S control section 12 so as to be utilized by later processing.

(3-1) When the request of the CPU 1 is a read request, the L2S control section 12 transfers data at the stage coincident with the request address from the Jth stage of the L2S data section 14 of the L2S buffer 15 to the CPU 1 via the L2S data output buffer 503 and the host bus 8 (refer to FIG. 9) and simultaneously stores the data into the L2S data input buffer 504 in the L2S buffer 15. Simultaneously, also the address and status information of the Jth stage in which the A line has been stored first is moved to the L2S address input buffer 500, and the contents of the Jth stage in which the A line has been stored are cleared. Then, the addresses, status and data are shifted such that those of the J–1th stage are shifted into the Jth stage and those of the J–2th stage are shifted into the J–1th stage while those of the first stage are shifted into the second stage. Then, the A line having been copied into the L2S data buffers 504 is shifted into the first stage, and the value of the L2S access counter first stage 131B is incremented by one. Then, the data having been stored into the L2S data input buffer 504 is shifted into the L2S data buffer first stage 141.

(3-2) If the request of the CPU 1 is a write request, then the data of the line outputted to the host bus 8 is latched by the L2S data input buffer 502 of the L2S data section 14 of the L2S buffer 15, and the address and status of the A line stored in the Jth stage of the L2S buffer 15 are simultaneously copied into the L2S address input buffer 500 of the L2S address and status section 13 while the data is copied into the L2S data input buffer 504 of the L2S data section 14. If the write request into the A line from the CPU 1 is a line write request, then the data of the L2S data input buffer 502 is used as it is, and after shifting processing of the inside of the L2S buffer 15 similar to that in the processing in (3-1). the address and status of the L2S address input buffer 500 are shifted to the first stage and also the data of the L2S data input buffer 502 is shifted to the first stage. If the write request into the A line from the CPU 1 is a write request into a partial block of the A line, the L2S control section 12 stores an A line obtained by merging processing of the data of the L2S data input buffer 502 into the data held in the L2S data input buffer 504 into the data part of the first stage. Then, the value of the L2S access counter first stage 131B is incremented by one, and the DIRTY flag of the register first stage 131C is set so as to indicate "update" (refer to FIG. 10).

Figure 11:
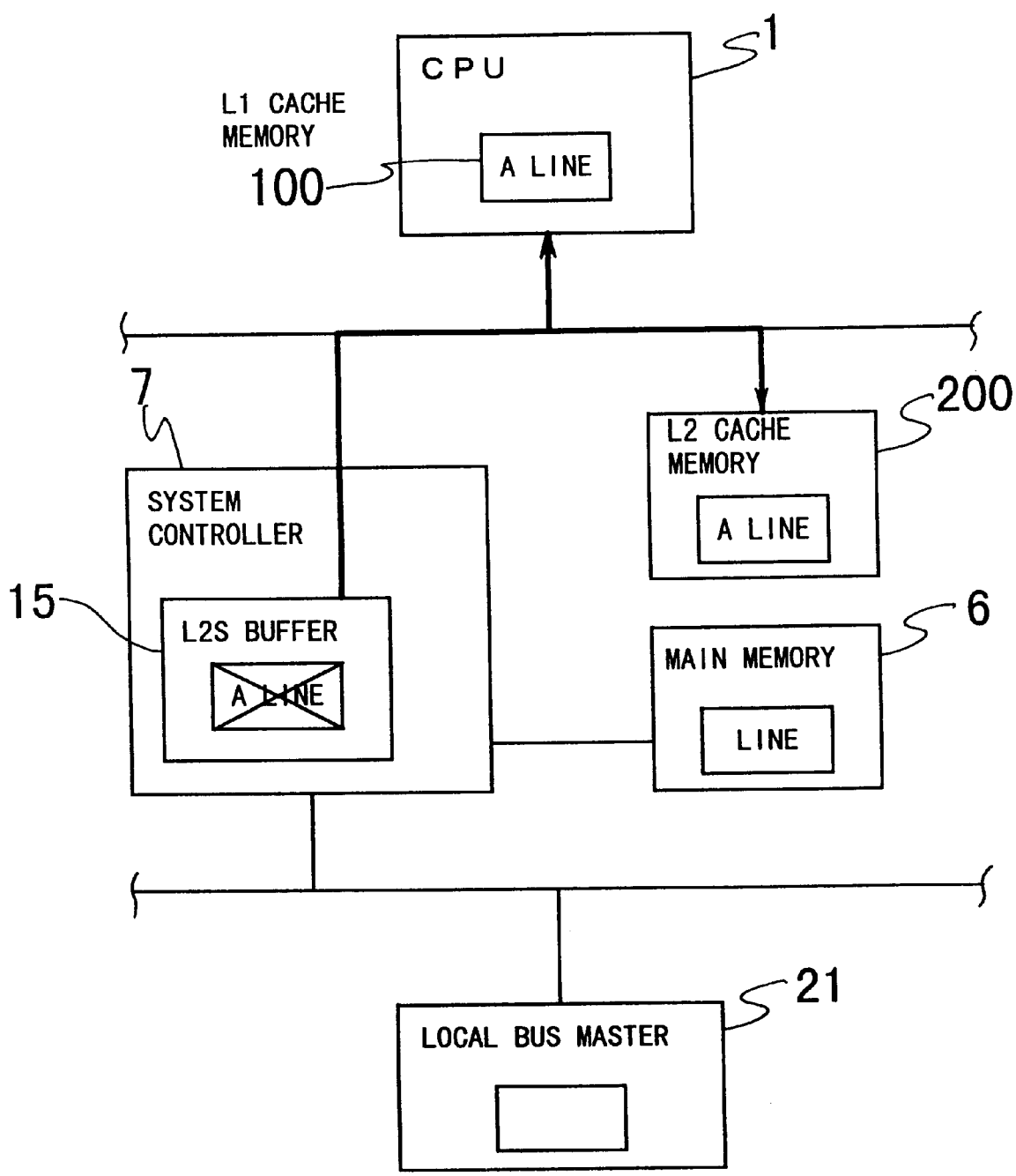
Figure 12:
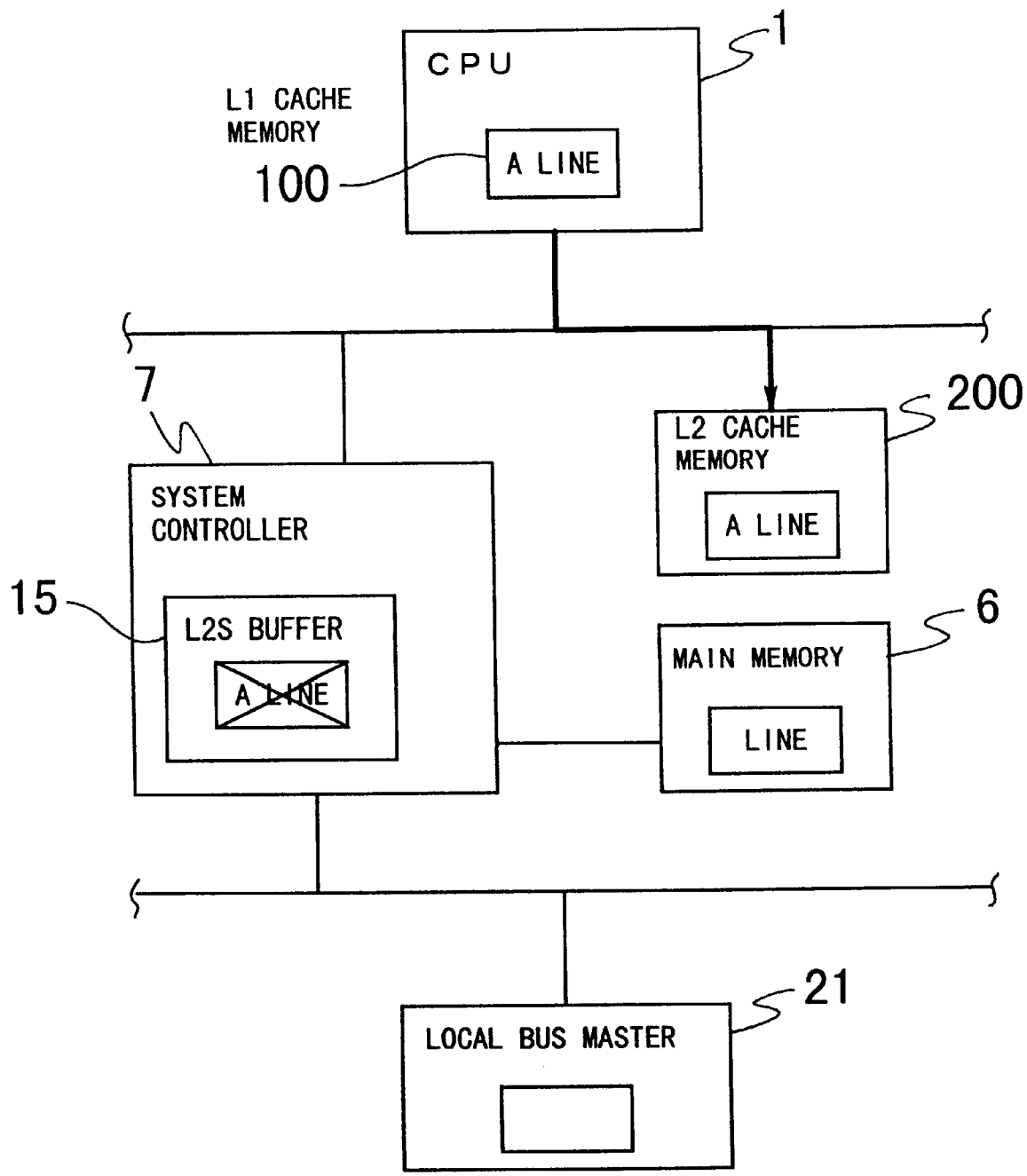
Figure 13:
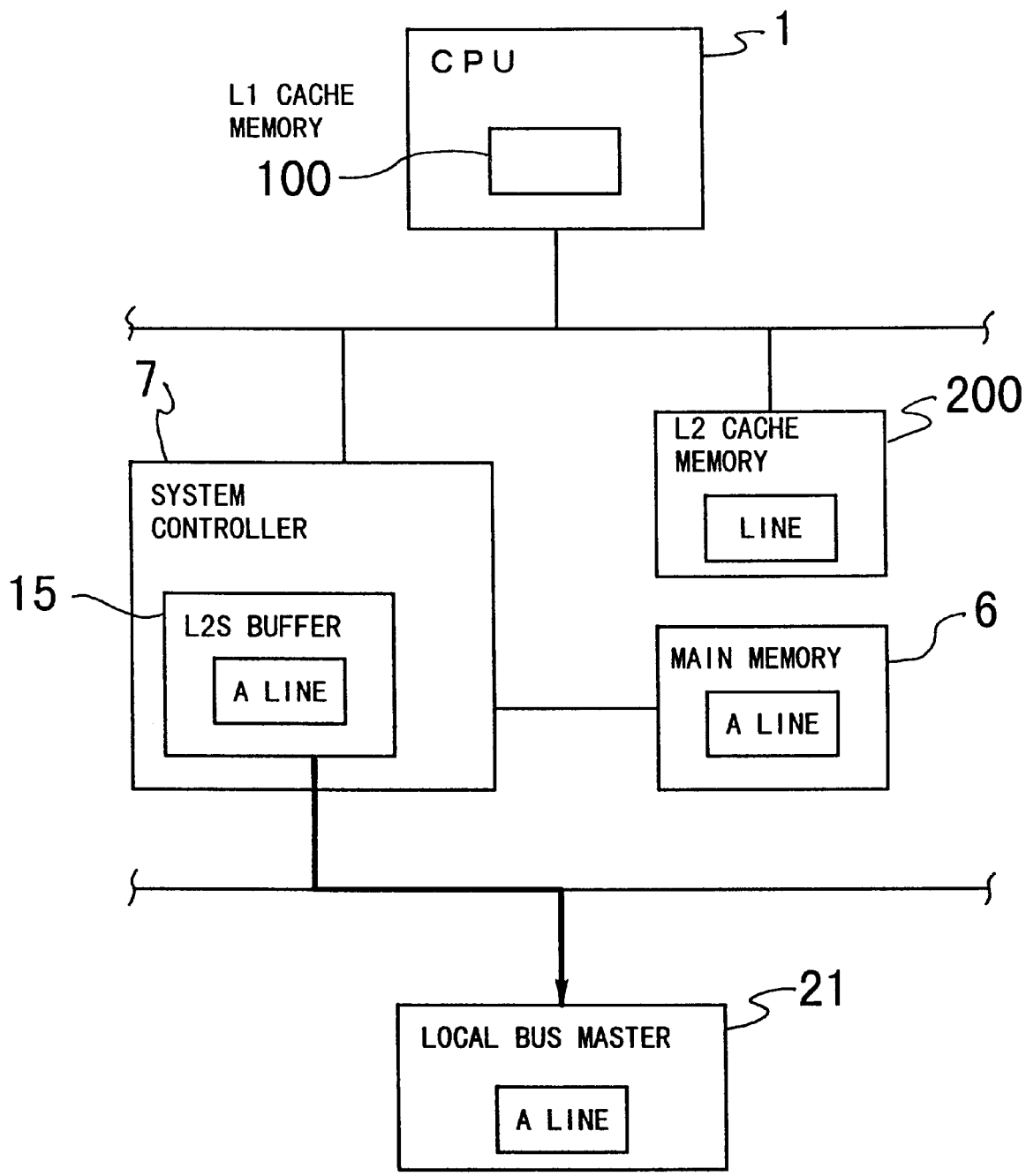
Figure 14:
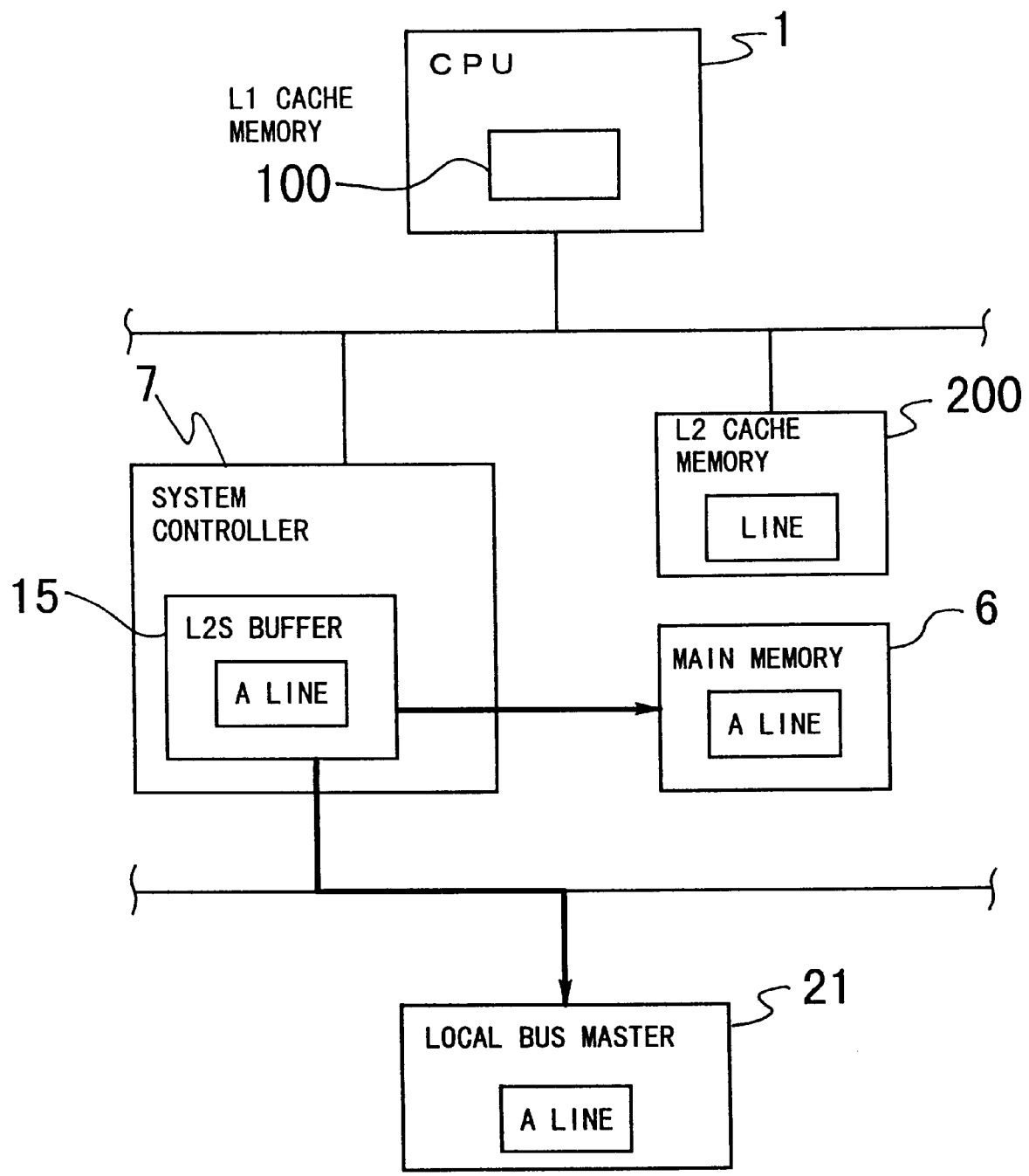
Figure 15:
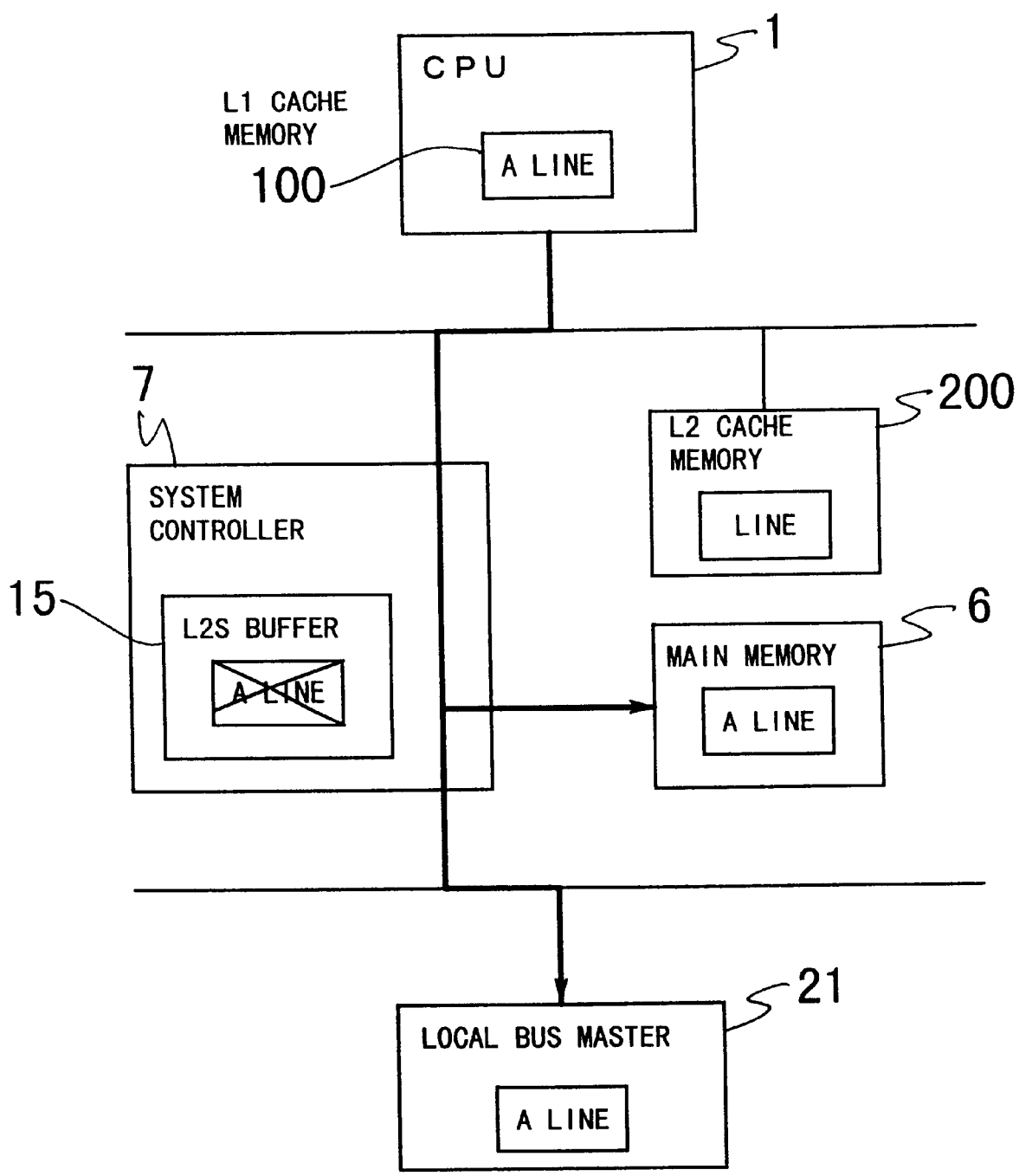
Figure 16:
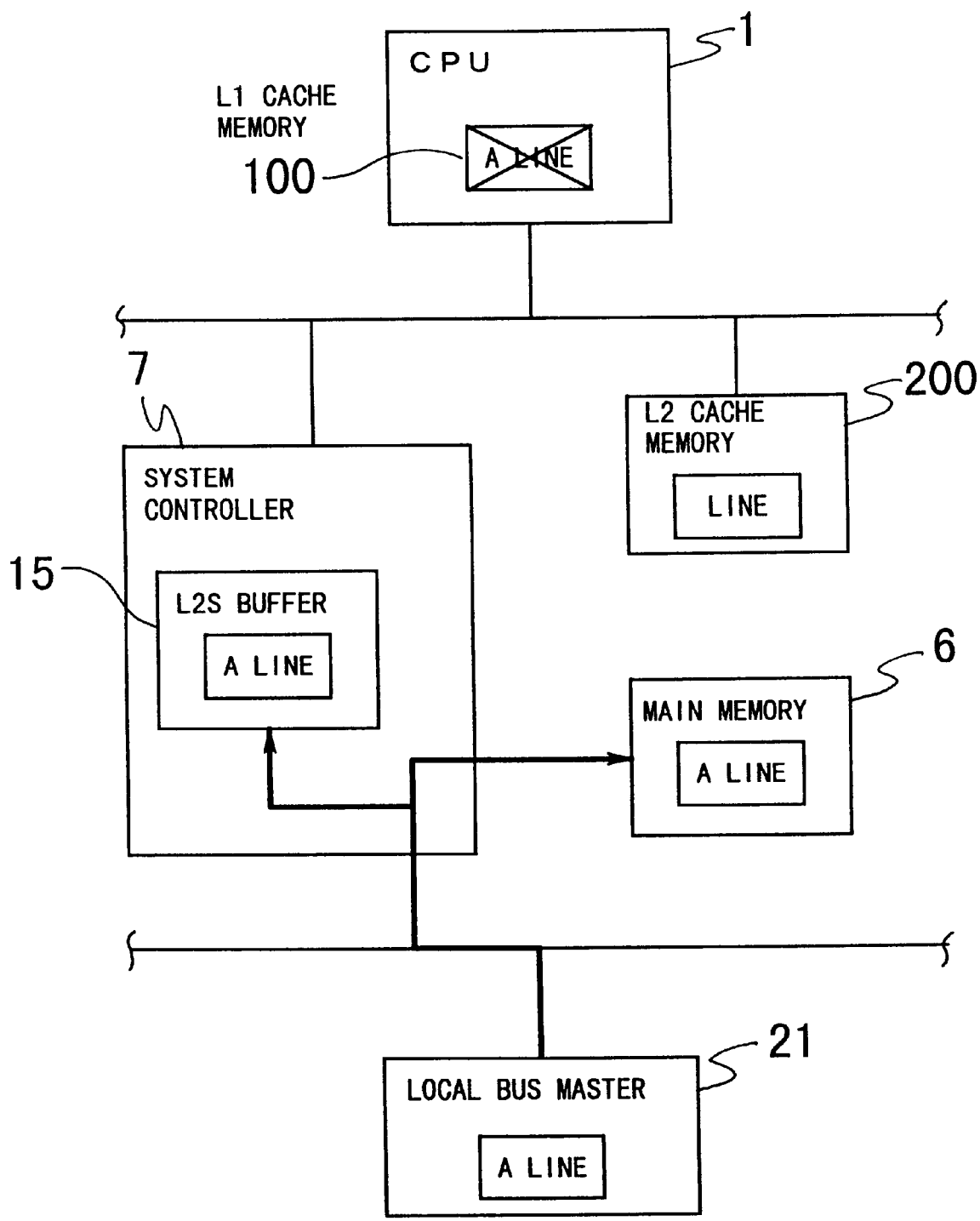
Figure 17:
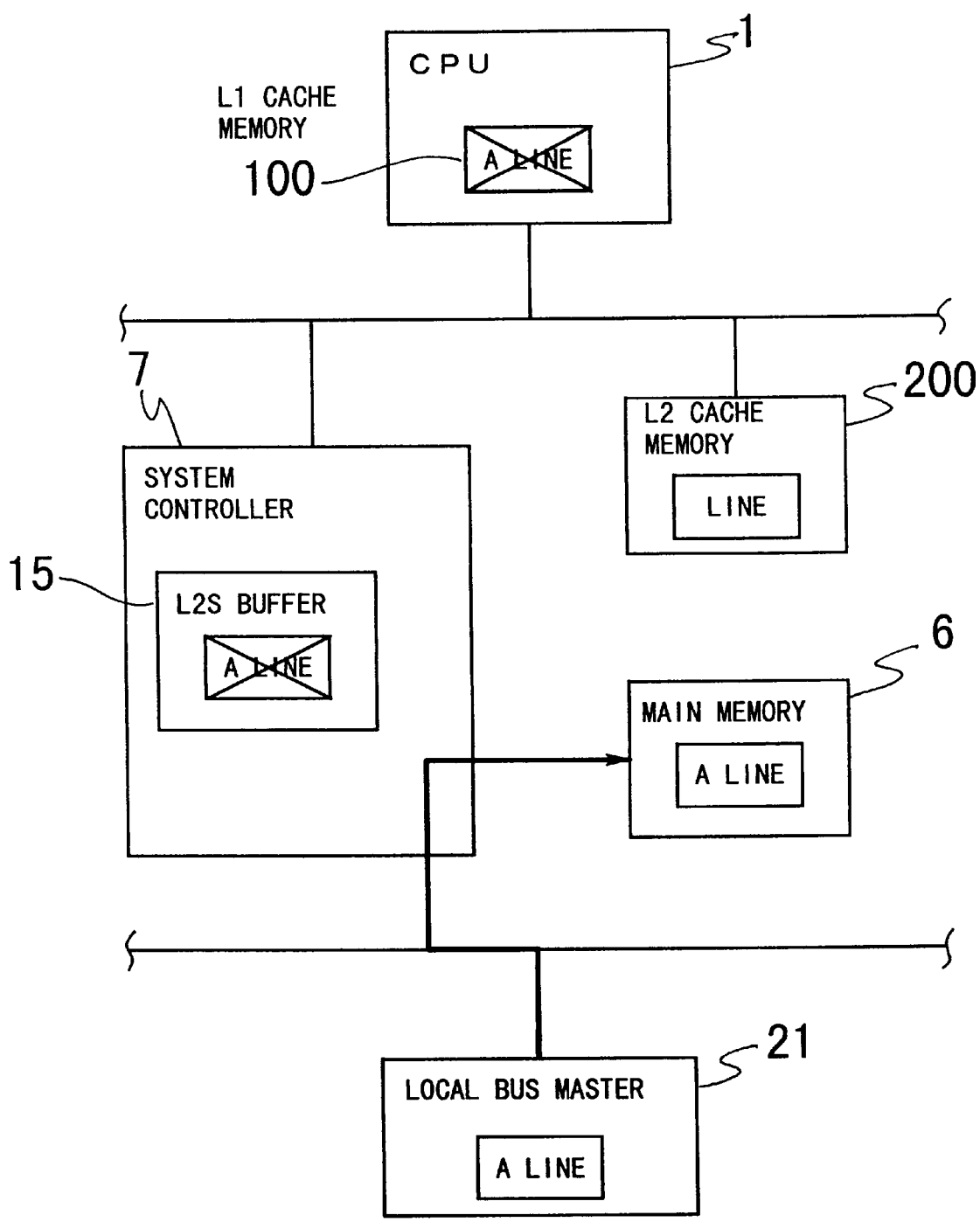

(3-3) If the VALID flag of the L2 status register 16 in (3-1) and (3-2) above, that is, the VALID flag of the L2 status register 16 of the L2 cache memory 200, which corresponds to the address lower AD-2 of the A line read requested by the CPU 1, stored in the inside of the system controller 7, is "invalid", then when the A line stored in the Jth stage in the inside of the L2S buffer 15 is to be transferred to the CPU 1 via the host bus 8, the L2S control section 12 cooperates with the L2 control section 11 to simultaneously perform processing of storing the A line into the L2 cache memory 200 (refer to FIG. 11). In this instance, while also the L2 status register 16 which represents status of the L2 cache memory 200 is changed simultaneously, in the case of (3-1), the VALID flag is set to "valid" and the DIRTY flag is set to the state at the point of time, but in the case of (3-2), that is, A line write requested by the CPU 1, the VALID flag is set to "valid" and the DIRTY flag is set to "update" without fail (refer to FIG. 12). The operation when the cycle requested by the CPU is a line write cycle is such as illustrated in FIG. 12, but when the cycle requested by the CPU is a write cycle for part of the A line, the system controller 7 first enters the A line stored in the L2S buffer 15 into the L2 cache memory 200 (FIG. 18) and then controls the L2 cache memory 200 to perform writing for the A line thereof as requested by the CPU. Further, the L2 status register 16 is set so that it indicates that the SD flag of the line having been entered into the L2 cache memory 200 in (3-1) or (3-2) belongs to the L2S cacheable area. (3-4) Subsequently, a case wherein the request for the A line from the local bus master 21 is a read request is described. Taking a situation into consideration that the line requested by the local bus master 21 is present in the L1 cache memory 100 in the inside of the CPU 1, the system controller 7 controls, after it acquires the host bus 8, the CPU 1 to snoop the address of the A line.

(3-4-1) First, a case wherein write back processing of the A line from the L1 cache memory 100 is not executed based on a result of the snooping for the A line in the L1 cache memory 100 is described. The request address from the local bus master 21 is compared, similarly as in (2) above, with the L2S address buffer first to N–1th stages 131A to (131+N)A, and since the A line is present in the Jth stage and the VALID flag of the A line in the L2S address and status section 13 indicates "valid", the L2S control section 12 transfers the data of the Jth stage, whose address has exhibited coincidence with the request address, to the local bus master 21 via the local bus 20 (refer to FIG. 13). In this instance, if the DIRTY flag of the status in the Jth stage of the A line present in the L2S buffer 15 indicates "update", then the L2S control section 12 controls the main memory control section 10 to execute write back processing of the A line (refer to FIG. 14). Simultaneously, shifting processing in the inside of the L2S buffer 15 which is similar to that in the case wherein the CPU 1 acts as the master is performed, and then, the A line is copied into the L2S address input buffer 500 and the L2S data input buffer 504, whereafter the Jth stage of the L2S buffer 15 in which the A line is stored is erased, whereafter shifting processing from the first stage through the J–1th stage is executed. Then, when the address, status and data are to be shifted from the L2S address input buffer 500 and the L2S data input buffer 504 to the first stage, the DIRTY flag of the status of the A line is set to the register first stage 131C so that it indicates "common" with the main memory 6 in place of "update", and the value of the L2S access counter first stage 131B is incremented by one.

(3-4-2) Subsequently, a case wherein write back processing of the A line which has been stored in the L1 cache memory 100 is executed based on a result of the snooping of the A line in the L1 cache memory 100 is described. Since the snooping is, for the CPU 1, snooping of the read request for the A line, the state of the A line is not rendered invalid and can remain as the valid state. In other words, since the A line can continue to remain present as valid in the L1 cache memory 100, the A line need not be present in the L2S buffer 15. Accordingly, if the A line is present in the L2S buffer 15 as a result of the request address from the local bus master 21, effective utilization of the L2S buffer 15 is achieved by erasing the contents of the Jth stage present in the L2S buffer 15 and executing shifting processing in the inside of the L2S buffer 15. In this instance, the first stage of the L2S buffer 15 becomes free. Naturally, the system controller 7 performs write back processing of the A line from the CPU 1 for the main memory 6 and transfers the data to the local bus master 21 (refer to FIG. 15).

(3-5) When the request for the A line from the local bus master 21 is a write request, taking a case into consideration that the line requested by the local bus master 21 is present in the L1 cache memory 100 in the inside of the CPU 1, the system controller 7 causes the CPU 1 to snoop the address of the A line after it acquires the host bus 8.

(3-5-1) When the request for the A line from the local bus master 21 is a line write request, if write back processing of the A line from the L1 cache memory 100 to the main memory 6 is executed based on a result of the snooping of the A line in the L1 cache memory 100 in the inside of the CPU 1, then after the writing back of the A line which has been in the L1 cache memory 100, if data writing from the local bus master 21 is not supported, then the status of the A line present in the L1 cache memory 100 is changed to that of an invalid line. Accordingly, in this instance, the L2S control section 12 stores, where the request for the A line present in the inside of the L2S buffer 15 from the local bus master 21 is a line write request, the write data into the L2S data input buffer 502 and writes the A line also into the main memory 6 (refer to FIG. 16). Then, the contents of the Jth stage in the inside of the L2S buffer 15 in which the A line has been stored are erased. Then, when the A line is to be stored into the first stage after shifting processing of the first to J−1th stages in the inside of the L2S buffer 15, the DIRTY flag of the register first stage 131C is set to "common" and the VALID flag is set to "valid" as it is, and the value of the L2S access counter first stage 131B is incremented by one.

(3-5-2) If write back processing of the A line to the main memory 6 does not occur based on a result of the snooping in the L1 cache memory 100, then it is entrusted to a user to selectively determine whether or not line write of the A line present in the L2S buffer 15 should be supported from the local bus master 21.

(3-5-3) If the write request for the A line from the local bus master 21 is a write request for some block of the A line, then there is little significance in supporting of updating of data by writing from the local bus master 21 irrespective of a result of the snooping of the A line in the L1 cache memory 100 of the CPU 1. However, when write back processing is not performed based on a result of the snooping in the L1 cache memory 100, if the DIRTY flag of the status of the A line indicates updating with respect to the main memory 6 as a result of simultaneous snooping in the L2S buffer 15, prior to writing into the main memory 6 from the local bus master 21, the A line stored in the Jth stage of the L2S buffer 15 is written back once into the main memory write buffer 17 and writing of some block of the A line from the local bus master 21 is merge processed in the inside of the main memory write buffer 17, whereafter writing into the main memory 6 is performed. On the other hand, when write back processing is started as a result of the snooping processing of the A line in the L1 cache memory 100, the write back processing of the A line from the L1 cache memory 100 is ignored to make the VALID flag of the status of the A line in the Jth stage of the L2S buffer 15 and the A line in the Jth stage in the inside of the L2S buffer 15 is erased. Accordingly, in this instance, after the A line written back from the L1 cache memory 100 is written back into the main memory write buffer 17, a result of merging processing of the writing of some block into the A line from the local bus master 21 in the inside of the main memory write buffer 17 is written back into the main memory 6, and write support to the L2S buffer 15 is not performed (refer to FIG. 17). In this instance, the L2S control section 12 erases the Jth stage of the L2S buffer 15 and executes shifting processing in the inside of the L2S buffer 15. As a result of the shifting processing in the inside of the L2S buffer 15, the first stage of the L2S buffer 15 becomes free. If the write request for the A line from the local bus master 21 is a write request of one byte, then if write back processing of the A line into the main memory 6 from the CPU 1 is executed based on a result of the snooping of the A line in the CPU 1, then the L2S control section 12 executes A line write back processing of the A line, which is present in the L2S buffer 15, from the CPU 1. Further, for changing of one byte of the A line from the local bus master 21, data changing of one byte must be performed for the A line present in the inside of the L2S buffer 15. In a case wherein the write access for the A line from the local bus master 21 is, where the A line is divided into a plurality of blocks, a plurality of write accesses for the individual blocks and shifting processing in the inside of the L2S buffer 15 is performed between the divisional accesses, since write accessing for some block of the A line from the local bus master 21 is supported, the improvement in performance cannot be anticipated as the processing amount in the inside of the L2S buffer 15 increases proportionally. Therefore, in the present invention, such write accessing is not supported. Therefore, for a write request other than a line write for the A line from the local bus master 21, the L2S control section 12 sets the VALID flag of the status of the A line present in the L2S buffer 15 to "invalid" and erases the contents in the stage.

The processing responsive to read/write requests relating to the L2S buffer 15 and the L2S control section 12 from the CPU 1 or the local bus master 21 is such as described above. Subsequently, a manner of variation of the status of the individual stages of the L2S buffer 15 other than the foregoing and control of the L2S control section 12 when the status changes are described.

(4) The status of the L2S buffer 15 is represented, as flags representative of status of a line corresponding to an address stored in each stage, a VALID flag indicating whether the line of the stage is valid or invalid, a DIRTY flag indicating whether or not the line of the stage has been updated with respect to or is common with the main memory 6, and an access counter for storing a number of times by which the line is accessed while it is present in the L2S buffer 15.

Figure 20:
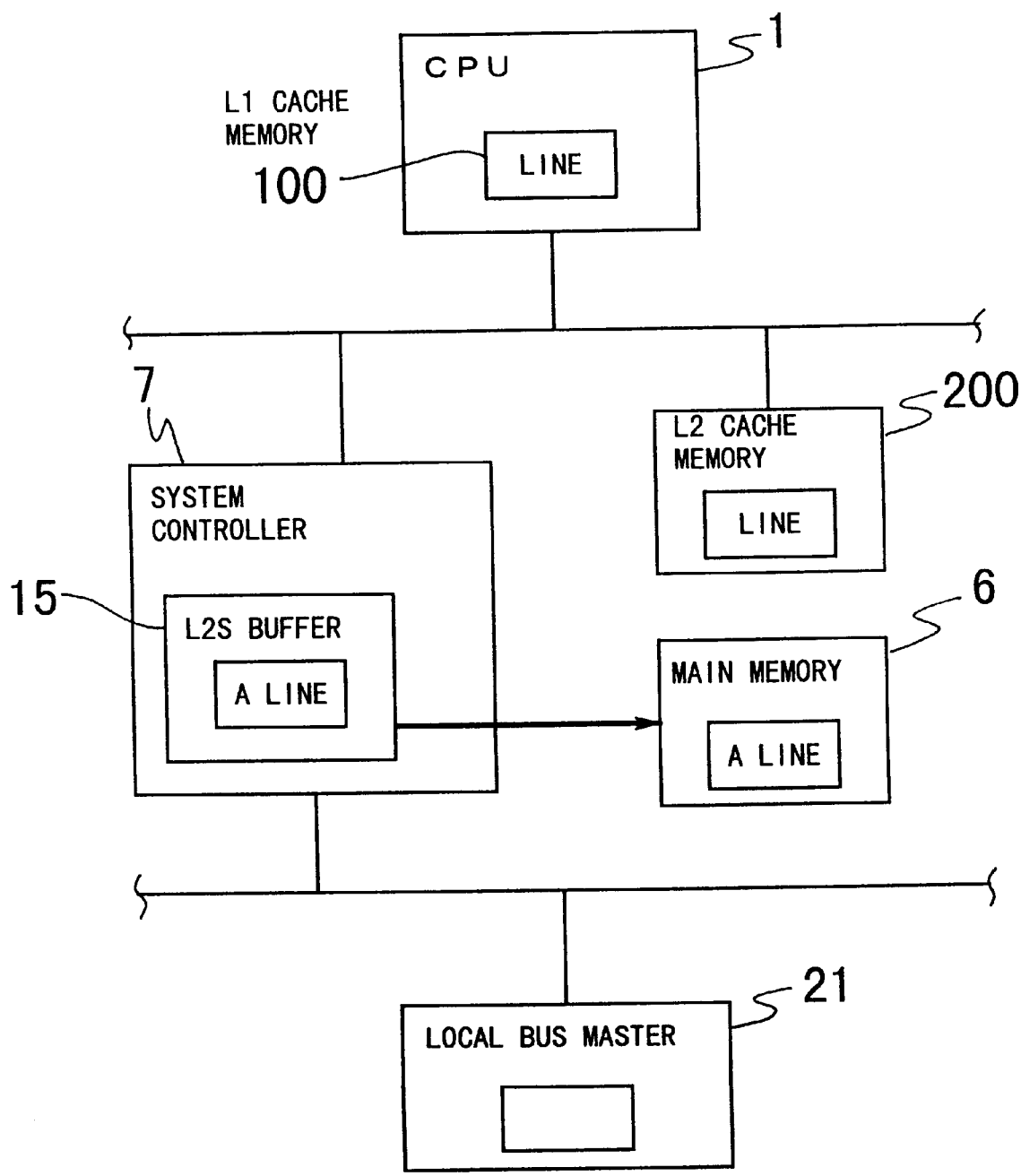
Figure 21:
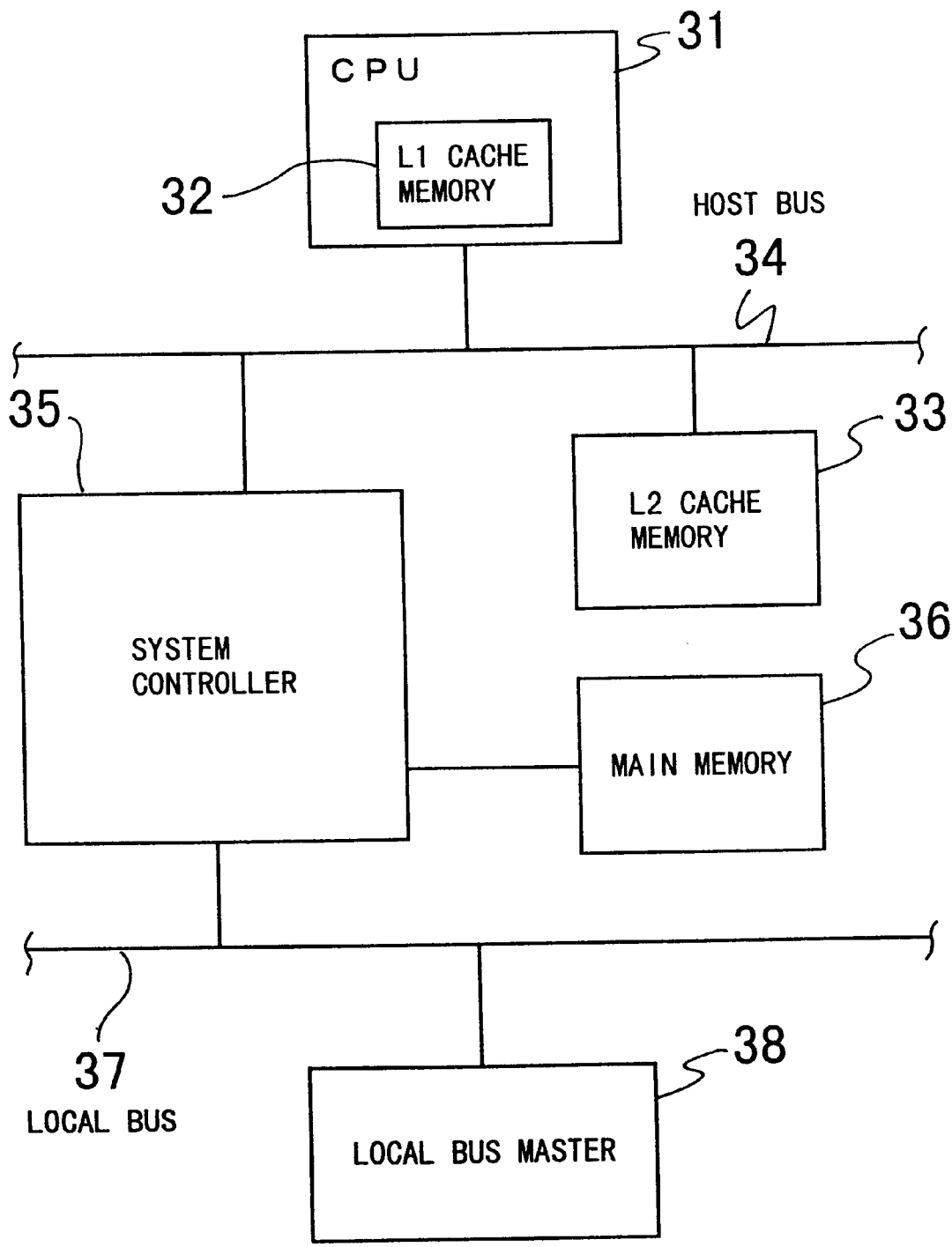
FIG. 21 is a block diagram showing an exemplary one of conventional cache memory apparatus.
Figure 22:
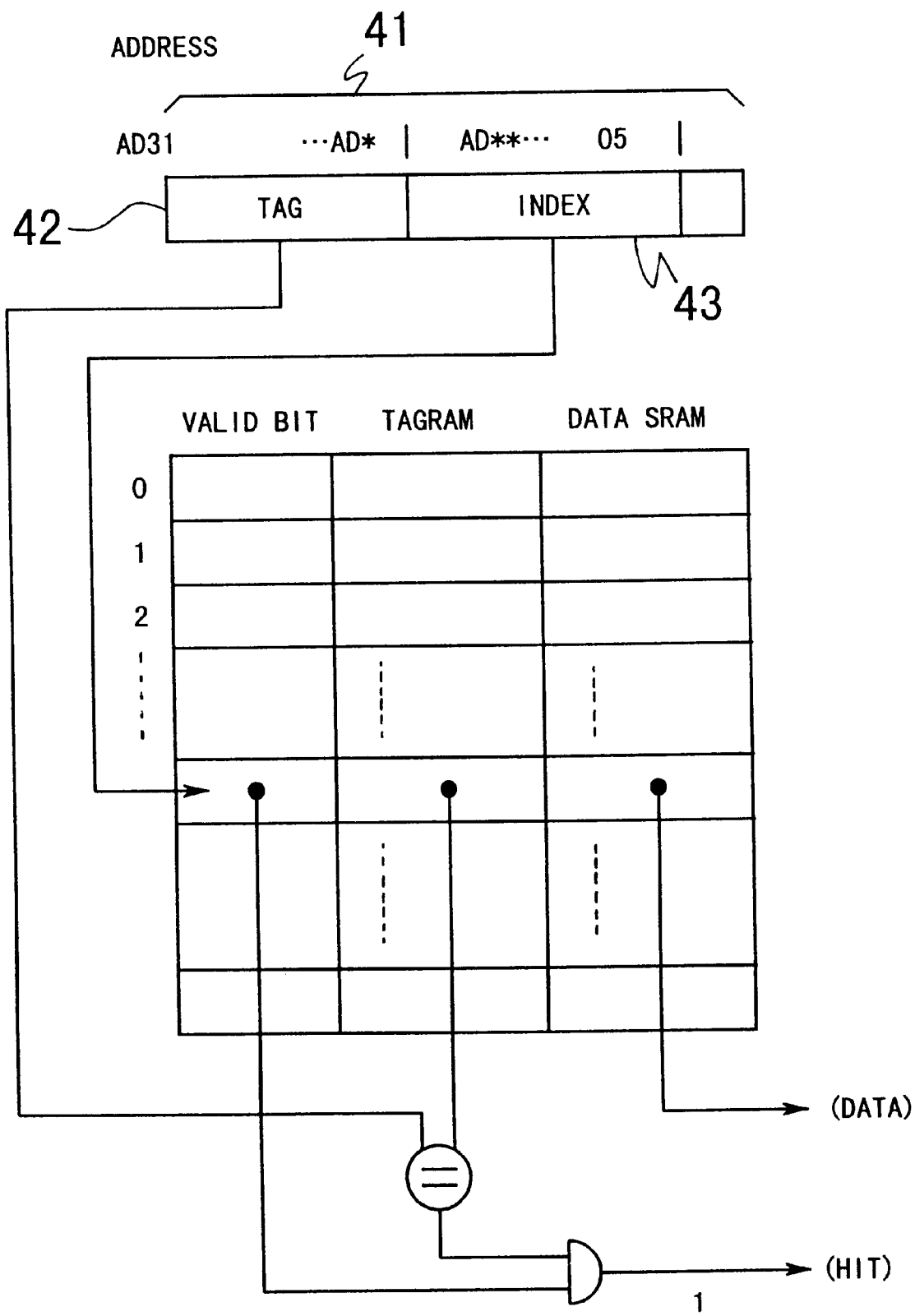
FIG. 22 is a diagrammatic view illustrating addresses of a cache system of the direct map type.

As described above, the internal buffer structure of the L2S buffer 15 is similar to an N stage FIFO structure. Accordingly, a line accessed or inputted latest is stored in the first stage while another line which remains present longest in the inside of the L2S buffer 15 is stored in the N−1th stage. The L2S buffer 15 supports write back to the main memory 6 in response to write from the CPU 1. Accordingly, a line whose DIRTY flag in the inside of the L2S buffer 15 indicates "update" can be stored. However, since the L2S buffer 15 is finite, in such a case that all of the DIRTY flags of lines stored in the inside of the L2S buffer 15 indicate "update". If it is tried to store a line belonging to the cacheable area newly into the L2S buffer 15, replacement is required, and write back processing of an already stored updated line into a line memory is required once. Accordingly, in this instance, since additional processing time is required, the L2S control section 12 normally conforms the states of the main memory 6 and the main memory write buffer 17 from the main memory control section 10 and, if the main memory 6 or the main memory write buffer 17 has some free area, the L2S control section 12 performs write back processing into the main memory 6 of those stages whose VALID flags of the status in the inside of the L2S buffer 15 indicate "valid" and whose DIRTY flags indicate "update" beginning with the stage nearest to the N−1th stage within a range within which no bad influence is had on any other memory access. Then, after completion of the write back into the main memory 6, processing of re-setting the VALID flags of the status of the lines of the stages for which write back has been performed to "common" is performed to reduce the lines whose DIRTY flags in the inside of the L2S buffer 15 are "update". This flow is illustrated in FIG. 20.

Figure 18:
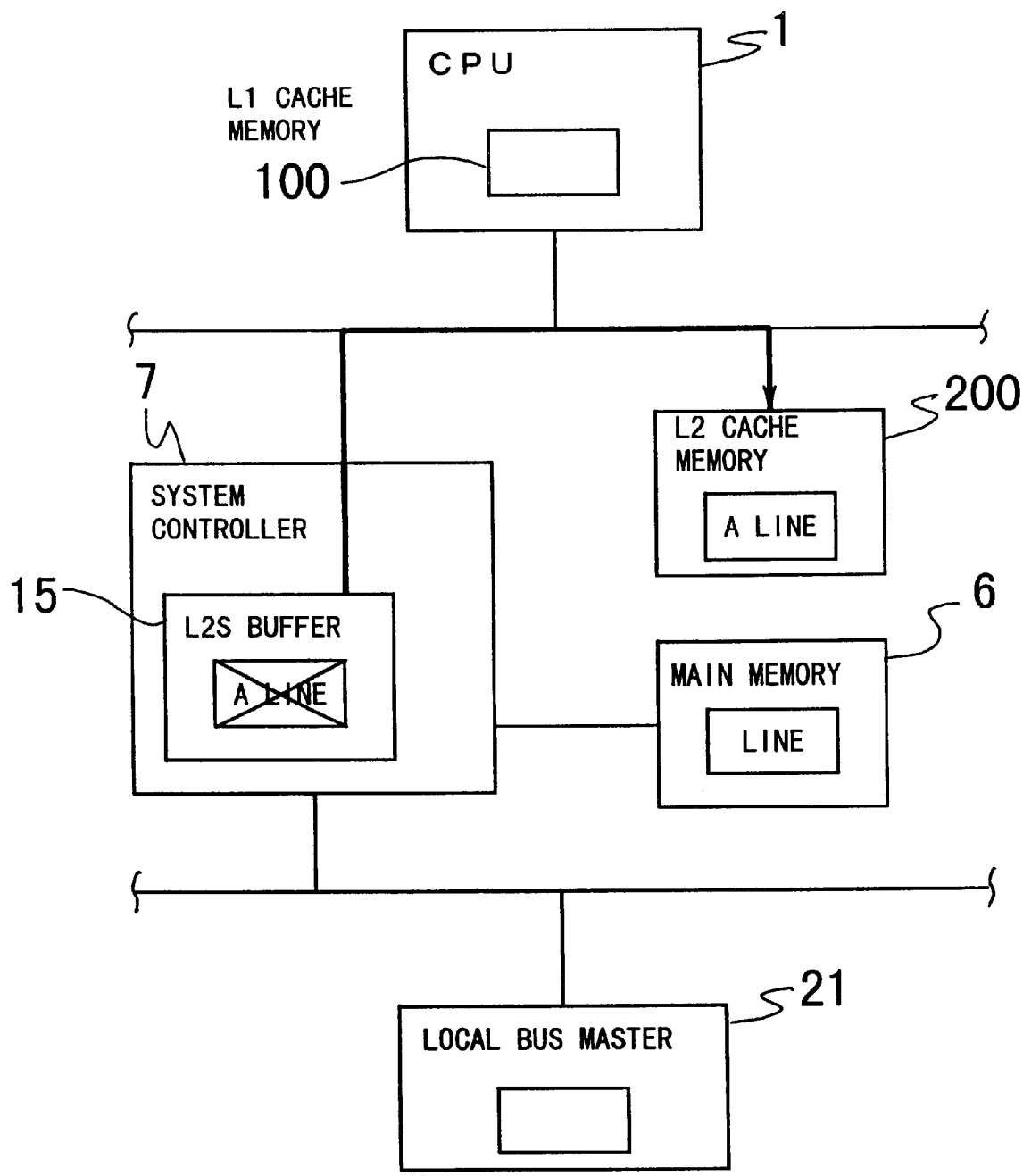

Further, for those of the L2S access counter first to N−1th stages 131B to (131+N)B in the inside of the L2S buffer 15 which exhibit a counted up value, if a result of checking of the SD flag of that line currently stored in the L2 cache memory 200 whose index of the lower address is equal proves that the line belongs to the L2S cacheable area, then the line is held as it is in the L2S buffer 15. However, if the SD flag indicates that the line does not belong to the L2S cacheable area and the DIRTY flag of the L2 status of the line does not indicate "update", then when the host bus 8 is idle, the system controller 7 outputs, after it acquires a host bus right, the address upper AD-1, the address lower AD-2, data and the AD-3 of the address of the line stored in the L2S buffer 15 to the host bus 8, stores the tag address AD-1 into an address of the L2 TAGRAM 2 of the L2 cache memory 200 designated by the Index of the address lower AD-2, stores the status into an index address of the L2 status register 16 designated by the address lower AD-2, erases the stage, from which it has been outputted, from the L2S buffer 15 so that the line having been stored into the L2 cache memory 200 may not overlap with the L2S buffer 15, and performs internal shifting of the L2S buffer 15 to achieve effective utilization of the L2S buffer 15. This flow of operations is illustrated in FIG. 18.

Figure 19:
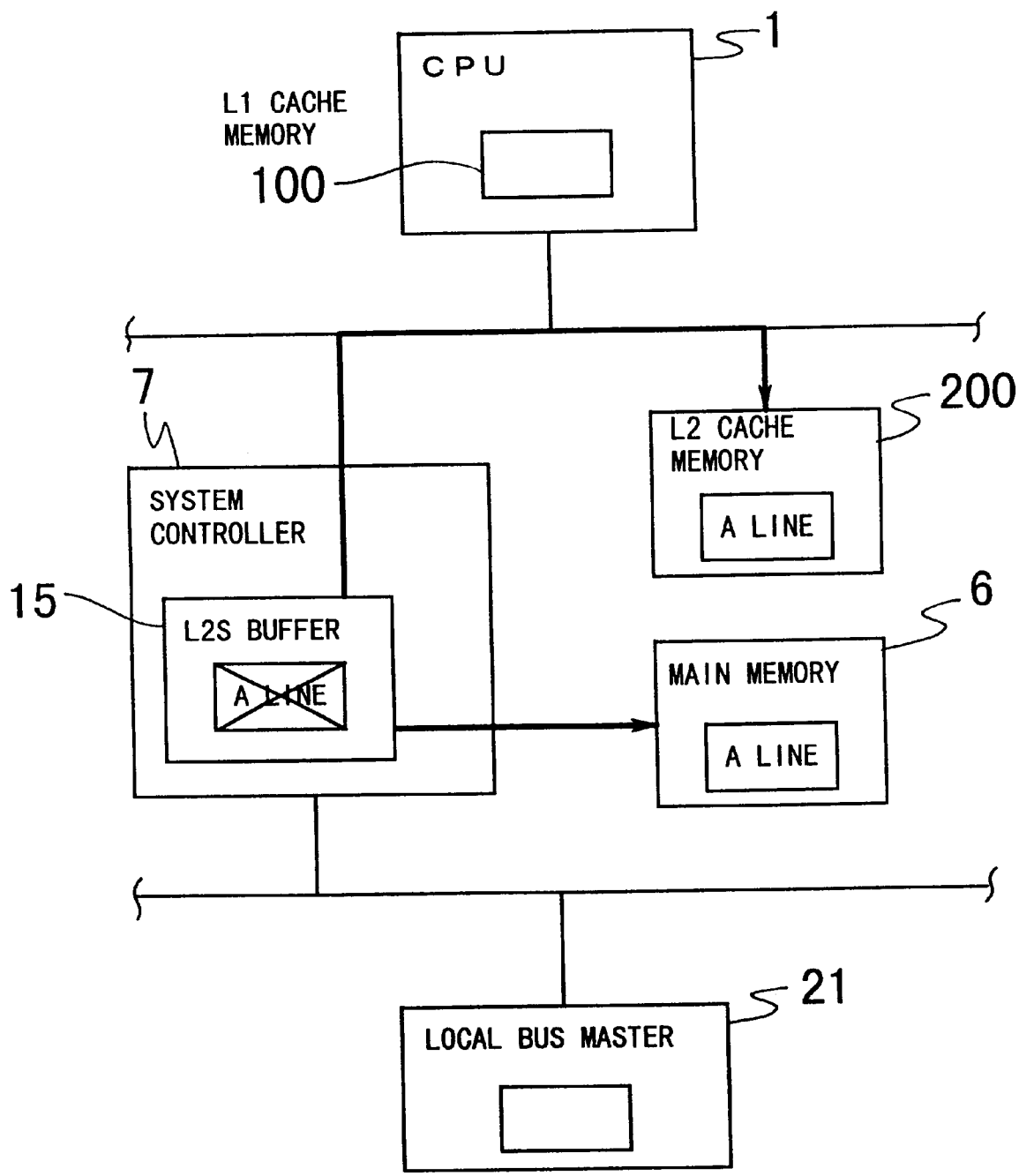

In this instance, when the line is returned to the L2 cache memory 200, if the DIRTY flag of the line is "update", then the state of the main memory write buffer 17 is confirmed from the main memory control section 10, and if the main memory write buffer 17 has some free area, then write back processing into the main memory 6 is performed simultaneously. Then, after the write back processing, the DIRTY flag of the L2 status register 16 is set to "common" in place of "update". This flow of operations is illustrated in FIG. 19.

(5) Subsequently, when a user wants to change the L2S cacheable area during operation of the system, the L2S control section 12 performs the following control.

First, the L2S control section 12 interrupts the memory request from the CPU 1 or the local bus master 21 to the main memory 6 once. Then, since the L2S buffer 15 can operate basically independently of the L2 cache memory 200, the L2S control section 12 writes all lines in those stages in each of which a line whose VALID flag in the L2S buffer 15 indicates "valid" and whose DIRTY flag indicates "update" is present back into the main memory 6. Consequently, a line whose DIRTY flag for the main memory 6 in the L2S buffer 15 indicates "update" is not present the L2S buffer 15 any more. Then, the L2 status register 16 is initialized. At this point of time, the L2S buffer 15 is flashed to allow changing over to a L2S cacheable area which is set newly by a user. Then, by starting the memory request from the CPU 1 or the local bus master 21 which has been interrupted till then, the user can change over the L2S cacheable area during operation of the system without flashing the L2 cache memory 200.

Having now fully described the invention, it will be apparent to one of ordinary skill in the art that many changes and modifications can be made thereto without departing from the spirit and scope of the invention as set forth herein.

What is claimed is:

1. A second level cache memory system, comprising:

a first level cache memory built in a central processing unit (CPU);

a second level cache memory of the direct map write back type for storing addresses and data of a main memory, said second level cache memory allowing read/write operations at a higher speed than that for said main memory;

a system controller connected to said main memory for controlling said main memory and said second level cache memory, a cacheable address, status and data buffer provided in said system controller for storing, corresponding to a particular region of said main memory which a user uses frequently or wants to use for processing at a speed as high as possible, a plurality of sets each including an address and data driven out from said second level cache memory by replacement of said second level cache memory and a status parameter of the address in said second level cache memory; and a plurality of access counters provided in said cacheable address, status and data buffer, each for recording, when, in response to a request from said CPU for an address and data stored in said cacheable address, status and data buffer, data corresponding to the address requested is transferred from said cacheable address, status and data buffer, information representing that the data corresponding to the requested address has been transferred from said cacheable address, status and data buffer, said access counters being used for internal control of said cacheable address, status and data buffer, control of said second level cache memory and control of said main memory.

2. A second level cache memory system, comprising:

a first level cache memory built in a central processing unit (CPU);

a second level cache memory of the direct map write back type for storing addresses and data of a main memory, said second level cache memory allowing read/write operations at a higher speed than that for said main memory;

a system controller connected to said main memory for controlling said main memory and said second level cache memory;

a cacheable address, status and data buffer provided in said system controller for storing, corresponding to a particular region of said main memory which a user uses frequently or wants to use for processing at a speed as high as possible, a plurality of sets each including an address and data driven out from said second level cache memory by replacement of said second level cache memory and a status parameter of the address in said second level cache memory; and a plurality of access counters provided in said cacheable address, status and data buffer each for recording, when, in response to a request from said CPU or from a local bus master connected to said CPU or said system controller by a local bus, for an address and data stored in said cacheable address, status and data buffer, data corresponding to the address requested is transferred from said cacheable address, status and data buffer, information representing that the data corresponding to the requested address has been transferred from said cacheable address, status and data buffer, said access counters being used for internal control of said cacheable address, status and data buffer, control of said second level cache memory and control of said main memory, wherein, when a cache miss occurs with said second level cache memory as a result of a request to said main memory from said local bus master connected to said CPU or said system controller by a local bus, if the request data is in said cacheable address, status and data buffer, the data is transferred from said cacheable address, status and data buffer to said local bus master.

3. A second level cache memory system, comprising:

a first level cache memory built in a central processing unit (CPU);

a second level cache memory of the direct map write back type for storing addresses and data of a main memory, said second level cache memory allowing read/write operations at a higher speed than that for said main memory;

a system controller connected to said main memory for controlling said main memory and said second level cache memory; and a cacheable address, status and data buffer provided in said system controller for storing, corresponding to a particular region of said main memory which a user uses frequently or wants to use for processing at a speed as high as possible, a plurality of sets each including an address and data driven out from said second level cache memory by replacement of said second level cache memory and a status parameter of the address in said second level cache memory; and a plurality of access counters provided in said cacheable address, status and data buffer, wherein, when data corresponding to an address request is transferred from said cacheable address, status, and data buffer, said plurality of access counters records information representing that the data corresponding to the requested address has been transferred.

4. A second level cache memory system as claimed in claim 3, wherein the information recorded in said plurality of cacheable address counters is used for internal control of said cacheable address, status and data buffer, control of said second level cache memory, and control of said main memory.

5. A second level cache memory system as claimed in one of claims 1–3, wherein, when an address and data are to be entered into said second level cache memory, said cacheable address, status and data buffer and said second level cache memory are controlled using a flag which represents whether or not the address of an object of the entry belongs to said particular region.

\* \* \* \* \*

UNITED STATES PATENT AND TRADEMARK OFFICE
CERTIFICATE OF CORRECTION

PATENT NO.     : 6,256,708 B1
DATED          : July 3, 2001
INVENTOR(S)    : Masataka Watanabe It is certified that error appears in the above-identified patent and that said Letters Patent is hereby corrected as shown below:

Column 1,
Line 21, delete "38" insert -- 36 --

Column 6,
Line 33, delete "Is" insert -- is --

Column 7,
Line 32, delete "Is" insert -- is --;
Line 44, delete the 1st occurrence of "8" insert -- 6 --

Column 8,
Line 7, delete "Is" insert -- is --

Signed and Sealed this

Twenty-sixth Day of February, 2002

Attest:

*Attesting Officer*

JAMES E. ROGAN
*Director of the United States Patent and Trademark Office*